(12) United States Patent
Fuchs et al.

(10) Patent No.: US 8,994,519 B1
(45) Date of Patent: Mar. 31, 2015

(54) METHOD OF CONTROLLING A VEGETATION REMOVAL SYSTEM

(76) Inventors: William Fuchs, Chester, ID (US);
Albert Babneau, Firth, ID (US)

(*) Notice: Subject to any disclaimer, the term of this patent is extended or adjusted under 35 U.S.C. 154(b) by 208 days.

(21) Appl. No.: 13/180,506

(22) Filed: Jul. 11, 2011

Related U.S. Application Data

(60) Provisional application No. 61/399,311, filed on Jul. 10, 2010.

(51) Int. Cl.
*B60Q 1/00* (2006.01)
*G01C 21/34* (2006.01)

(52) U.S. Cl.
CPC .................................. *G01C 21/3407* (2013.01)
USPC ............ 340/435; 340/425.5; 37/341; 37/348; 299/67; 348/144; 701/514

(58) Field of Classification Search
USPC ................. 340/435, 425, 425.5; 37/341, 348; 299/67; 348/144; 701/514
See application file for complete search history.

(56) References Cited

U.S. PATENT DOCUMENTS

| | | | | |
|---|---|---|---|---|
| 2,486,275 A | * | 10/1949 | Grinwald ............................ | 56/8 |
| 3,751,887 A | * | 8/1973 | Den Herder et al. ............... | 56/8 |
| 4,070,978 A | * | 1/1978 | Virgilio ............................ | 114/26 |
| 4,616,588 A | * | 10/1986 | Caddick ........................ | 114/162 |
| 4,828,432 A | * | 5/1989 | Ives .............................. | 405/270 |
| 5,203,099 A | * | 4/1993 | Naranjo et al. ................. | 37/329 |
| 5,435,083 A | * | 7/1995 | Thompson ...................... | 37/341 |
| 5,481,856 A | * | 1/1996 | Wickoren et al. .................... | 56/9 |
| 5,515,625 A | * | 5/1996 | Keigley .......................... | 37/405 |
| 5,970,634 A | * | 10/1999 | Dann et al. ...................... | 37/301 |
| 6,067,736 A | * | 5/2000 | Willis .............................. | 37/405 |
| 6,114,993 A | * | 9/2000 | Henderson et al. ...... | 342/357.27 |
| 6,336,051 B1 | * | 1/2002 | Pangels et al. .................. | 700/50 |
| 6,357,213 B1 | * | 3/2002 | Dillingham ........................ | 56/8 |
| 6,732,499 B2 | * | 5/2004 | Morgan et al. ....................... | 56/9 |
| 6,874,261 B2 | * | 4/2005 | Smit et al. ........................ | 37/307 |
| 6,910,319 B2 | * | 6/2005 | Castleberry ........................ | 56/8 |
| 6,918,801 B2 | * | 7/2005 | Wilson et al. .............. | 440/12.63 |
| 7,059,072 B2 | * | 6/2006 | Archuleta et al. .............. | 37/468 |
| 7,143,532 B2 | * | 12/2006 | Lowry ............................ | 37/345 |
| 7,832,126 B2 | * | 11/2010 | Koellner et al. ................ | 37/348 |
| 8,144,245 B2 | * | 3/2012 | Vik ............................ | 348/424.1 |
| 8,340,873 B2 | * | 12/2012 | Finley et al. .................... | 701/50 |
| 2004/0154279 A1 | * | 8/2004 | Nordstrom ...................... | 56/255 |
| 2004/0210370 A1 | * | 10/2004 | Gudat et al. .................... | 701/50 |
| 2005/0197755 A1 | * | 9/2005 | Knowlton et al. .............. | 701/50 |
| 2008/0125942 A1 | * | 5/2008 | Tucker et al. ................... | 701/50 |
| 2008/0133128 A1 | * | 6/2008 | Koch ............................ | 701/207 |

(Continued)

*Primary Examiner* — Benjamin Lee
*Assistant Examiner* — Quang D Pham

(57) ABSTRACT

This invention provides for a vegetation removal system capable of removing vegetation from irrigation canals, rivers, ponds, lakes, marshes and other water systems where the growth of vegetation impedes the flow of water, access to water or there is a desire to remove unwanted vegetation. The vegetation removal system comprises a rake system that allows for the removal of the vegetation while letting the water and silt or mud flow through the rake and substantially remain as part of the bank or bottom of the body of water. The invention also allows for the folding of the vegetation removal rake into a compact form by folding the outboard wings over on top of the main rake section. Sensors attached to the vegetation removal system can provide situational awareness for the operator as well as determine the position orientation of the rake when the rake is submerged or working near obstacles.

31 Claims, 21 Drawing Sheets

(56) References Cited

U.S. PATENT DOCUMENTS

| | | | |
|---|---|---|---|
| 2008/0282583 A1* | 11/2008 | Koellner et al. | 37/348 |
| 2010/0223008 A1* | 9/2010 | Dunbabin et al. | 701/301 |
| 2010/0269469 A1* | 10/2010 | Klobukowski | 56/8 |
| 2010/0312599 A1* | 12/2010 | Durst | 705/8 |
| 2011/0166715 A1* | 7/2011 | Hoffman et al. | 700/284 |
| 2011/0178677 A1* | 7/2011 | Finley et al. | 701/33 |

* cited by examiner

METHOD OF CONTROLLING A VEGETATION REMOVAL SYSTEM

CLAIM OF PRIORITY

This application claims priority to U.S. Provisional Patent Application No. 61/399,311 filed on Jul. 10, 2010 titled "Vegetation Removal System" and is incorporated by reference.

BACKGROUND OF THE INVENTION

1. Field of the Invention

This invention provides a vegetation removal system. Specifically, this invention relates to a system for removing vegetation from irrigation canals, rivers, ponds, lakes, marshes and other water systems where the growth of vegetation impedes the flow of water.

2. Related Art

Prior an systems have used manual labor or excavator bucks or backhoes to clear vegetation. In other prior an systems, various chemicals have been used to control or eliminate the grown of unwanted vegetation along waterways. All of these tools become problematic when the need arises to remove vegetation from irrigation canals, ponds or lakes. They are either labor intensive, use risky chemicals applications or remove the soil or bottom of the waterway.

SUMMARY

This invention provides for a vegetation removal system capable of removing vegetation from irrigation canals, rivers, ponds, lakes, marshes and other water systems where the growth of vegetation impedes the flow of water, access to water or there is a desire to remove unwanted vegetation. The vegetation removal system comprises a rake system that allows for the removal of the vegetation while letting the water and silt or mud flow through the rake and substantially remain as pan of the hank or bottom of the body of water.

The invention also allows for the folding of the vegetation removal rake into a compact form by folding the outboard wings over on top of the main rake section. This folding process may be accomplished manually if the rake is small, with hydraulic cylinders, or with hydraulic, pneumatic or electric actuators. By allowing the rake to be folding into a compact form, the vegetation removal rake is easily transported or stored. This become apparent when larger vegetation removal systems are employed where the vegetation removal rake can remain connected to the excavator during transportation so that productive time is not lost once the excavator arrives on a job site requiring time consuming unloading from the transport trailer as well as attachment and positioning of the rake to the excavator.

Sensors attached to the vegetation removal system provide situational awareness for the operator. Global positioning system sensors ("GPS") may provide position awareness relative to the geographic location of the excavation. Additional sensors may be attached to the vegetation removal system such that the operator can determine the position orientation of the rake system when the rake system is submerged. In other words, the sensors can determine whether the vegetation removal rake is extended, tilted to one side or another, etc. Other sensors may be added to assist the operator with maintaining consistent grade. These sensor systems when connected to computer systems can provide improved guidance, increased accuracy when implementing the vegetation removal plan and increased safety by warning excavator operators of potential overhead hazards such as electrical lines or submerged hazards such as underwater cables and pipelines.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE DRAWINGS

The components in the figures are not necessarily to scale, emphasis being placed instead upon illustrating the principles of the invention. In the figures, like reference numerals designate corresponding parts throughout the different views.

Figure 16:
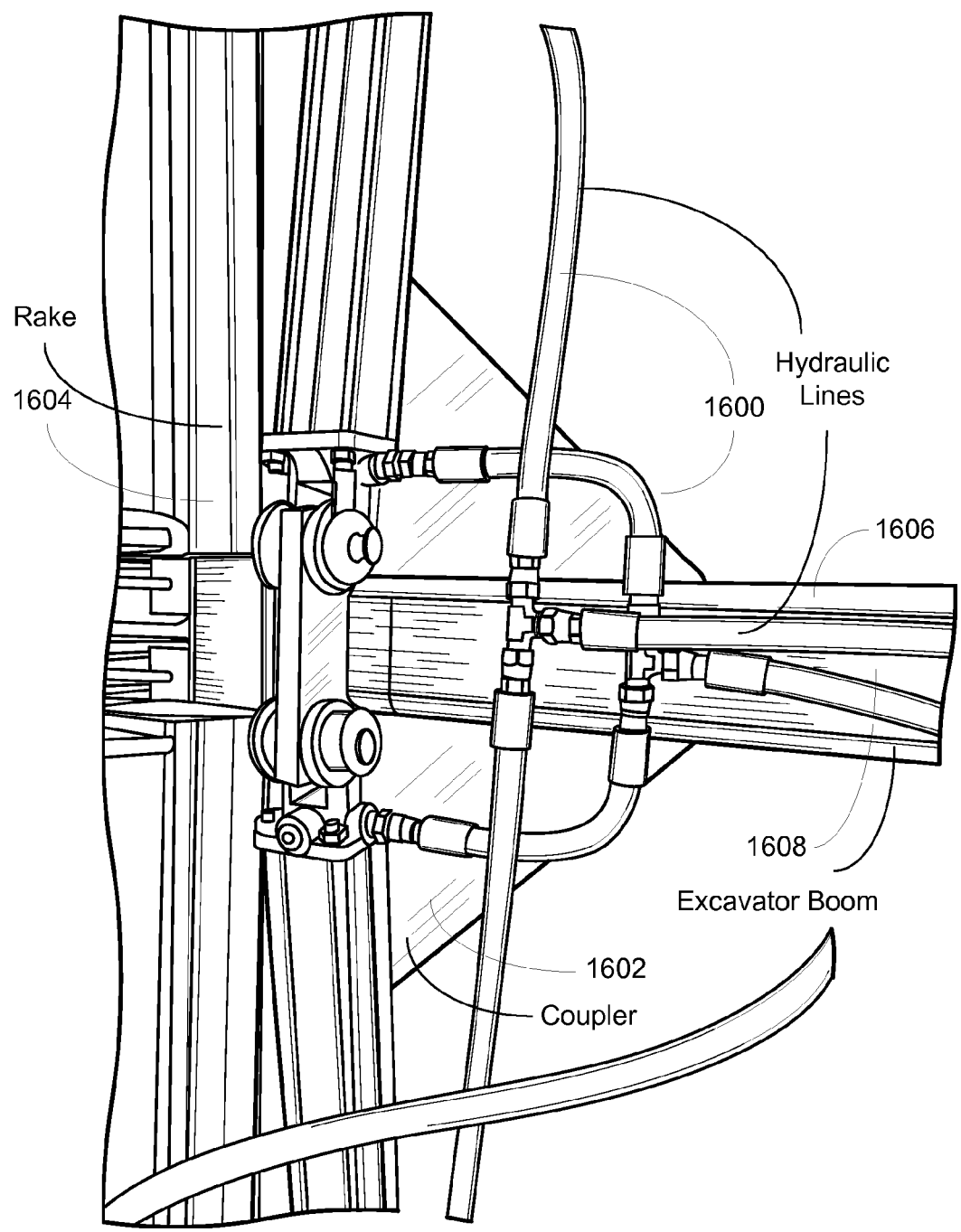

FIG. 16 top view of the hydraulic system attached to the vegetation removal system.

Figure 17:
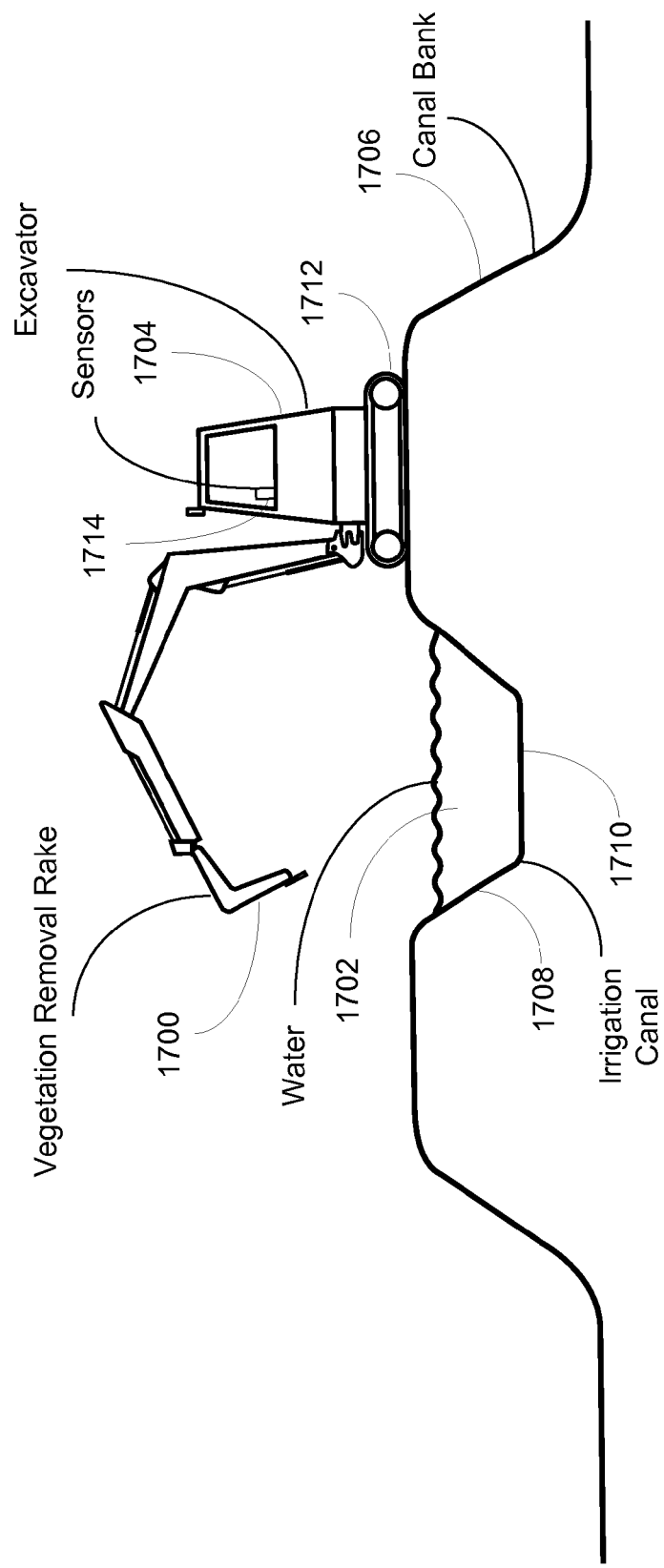

FIG. 17 is a view of the vegetation removal rake attached to an excavator working on an irrigation canal.

Figure 18:
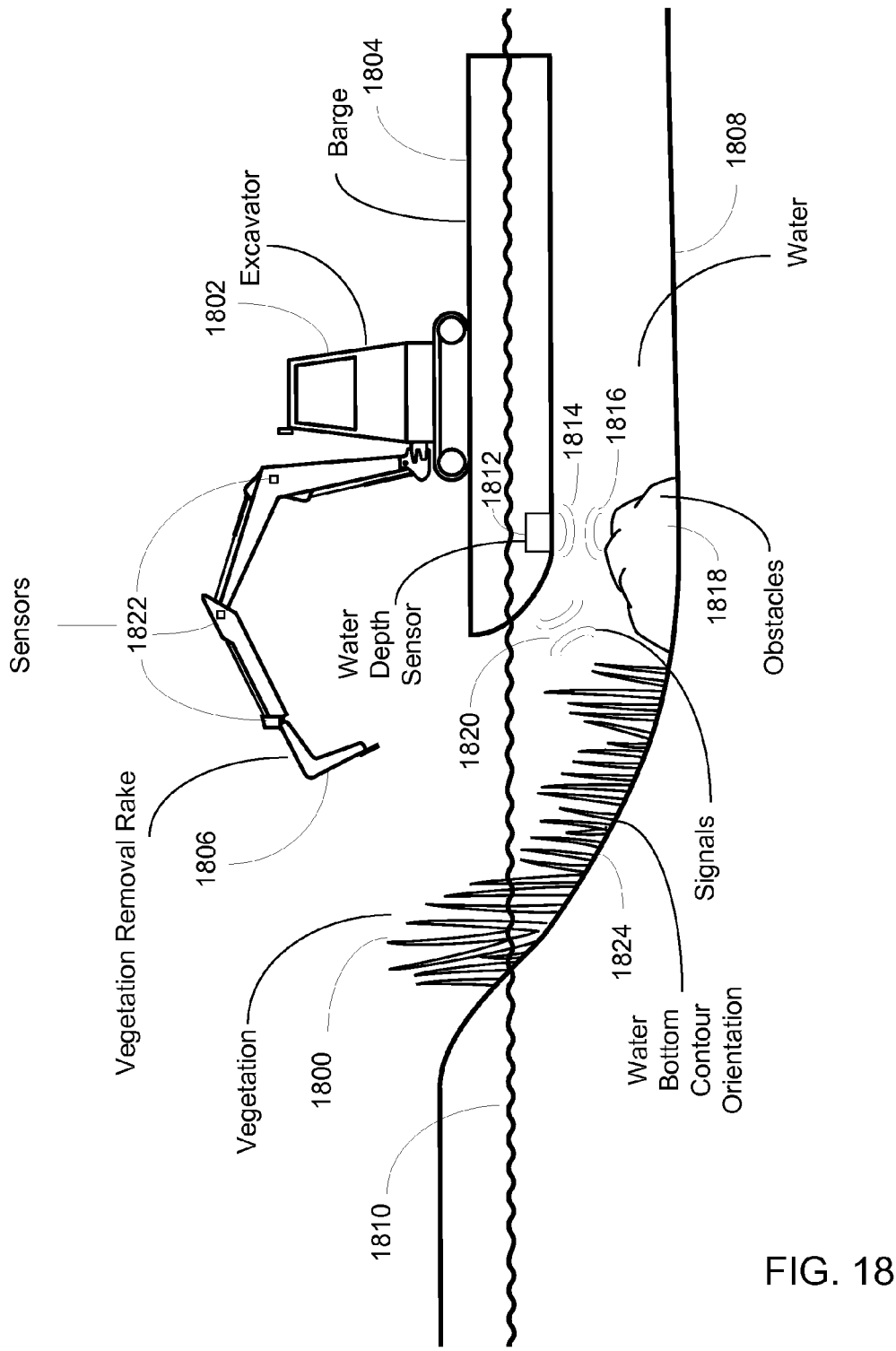

FIG. 18 is a view of the vegetation removal rake attached to an excavator working on a barge on a lake or pond.

Figure 19:
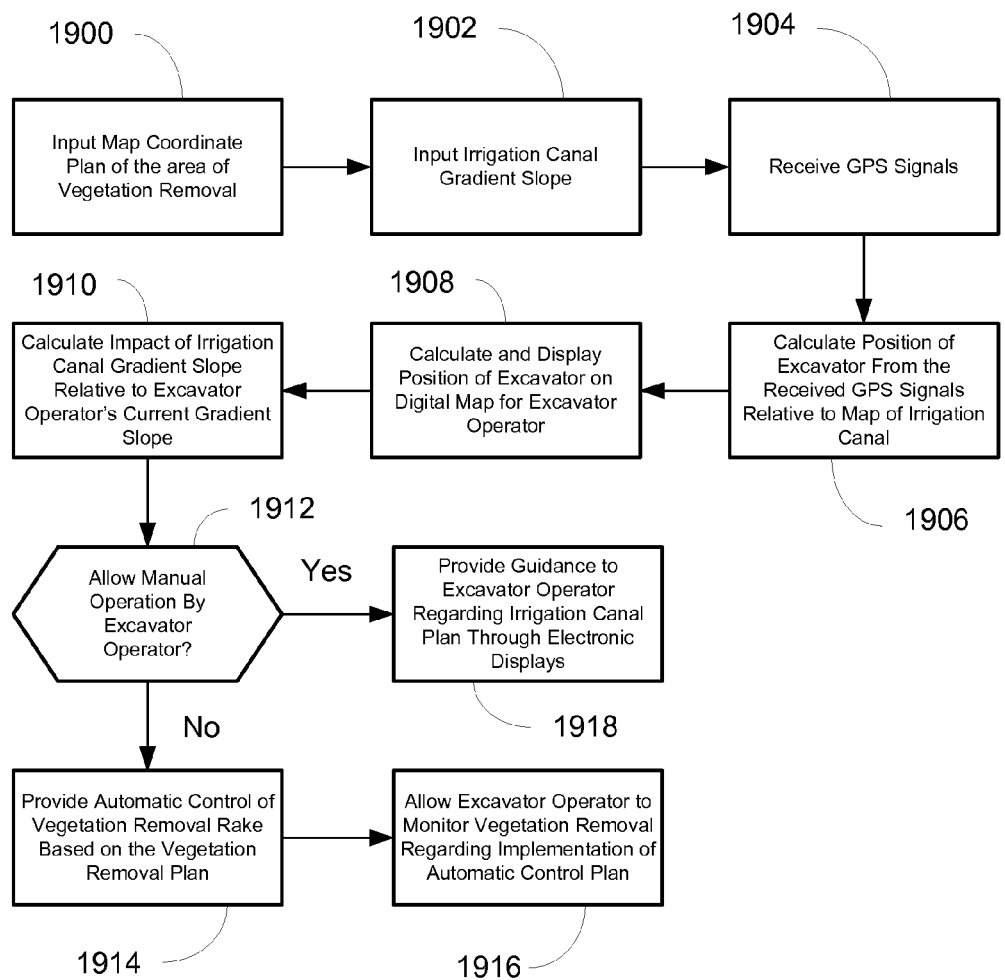

FIG. 19 is a block diagram of the process steps for inputting map coordinates and irrigation gradient into a computer to assist in the removal of vegetation by the vegetation removal rake excavator.

Figure 20:
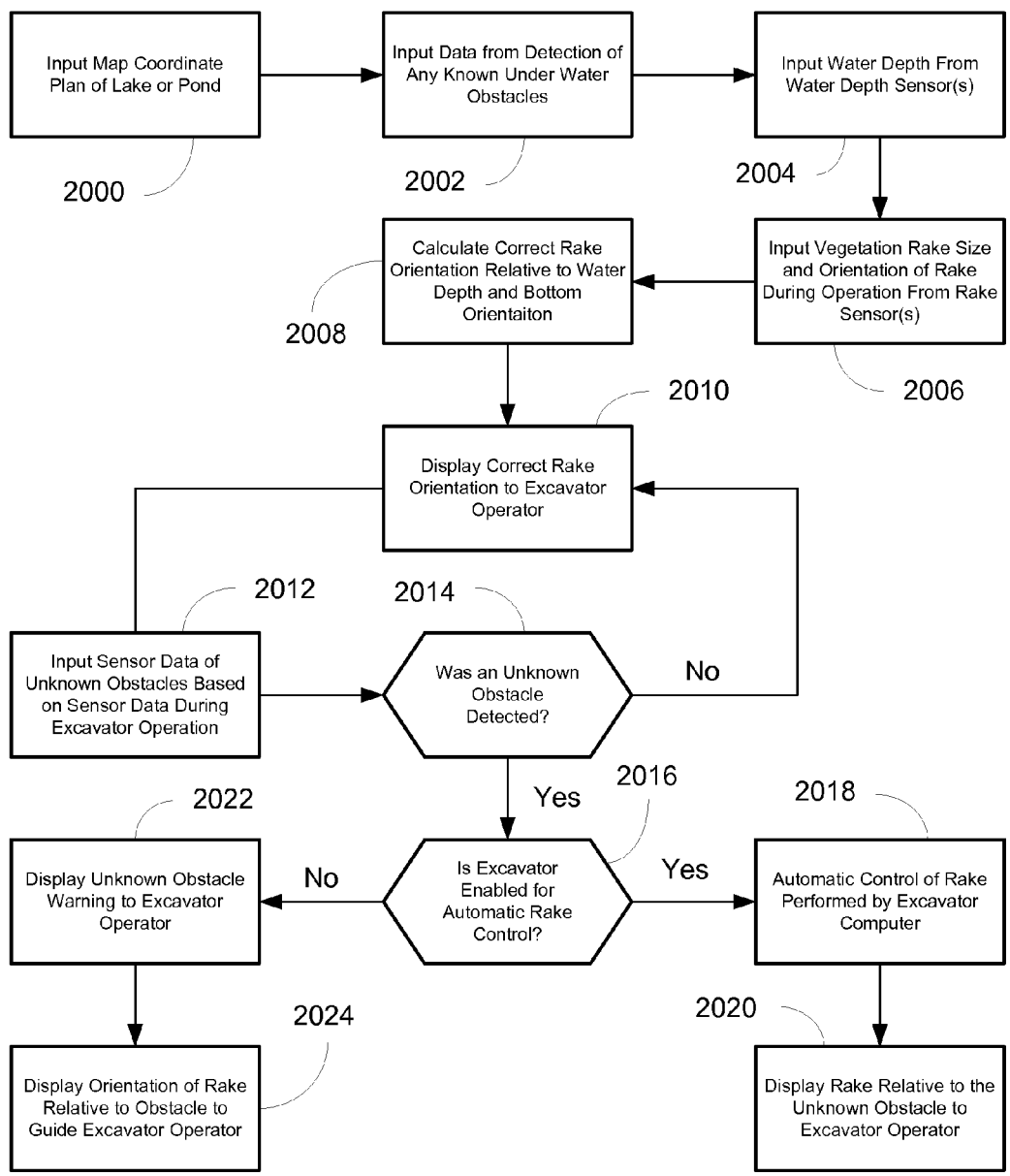

FIG. 20 is a block diagram of the process steps for receiving sensor data into a computer to assist an operator in the removal of vegetation when the vegetation removal rake is underwater.

Figure 21:
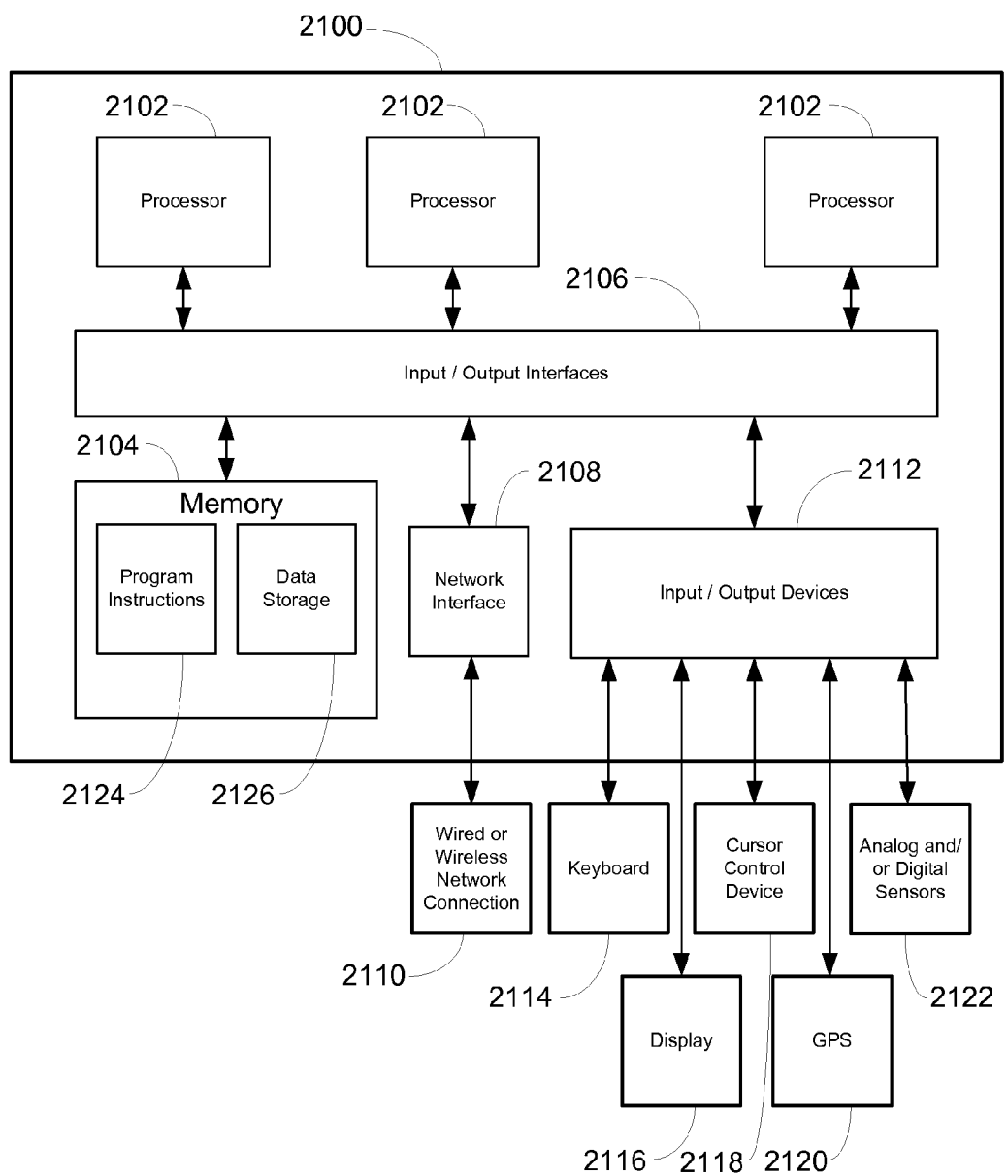

FIG. 21 is a block diagram of a computer system layout for running the vegetation removal rake control system software.

DETAILED DESCRIPTION

This invention provides for a vegetation removal system capable of removing vegetation from irrigation canals, rivers, ponds, lakes, marshes and other water systems where the growth of vegetation impedes the flow of water, access to water or there is a desire to remove unwanted vegetation. The vegetation removal system comprises a rake system 100 that allows for the removal of the vegetation while letting the water as well as the silt or mud flow through the rake and substantially remain as pan of the bank or bottom of the body of water.

Figure 1:
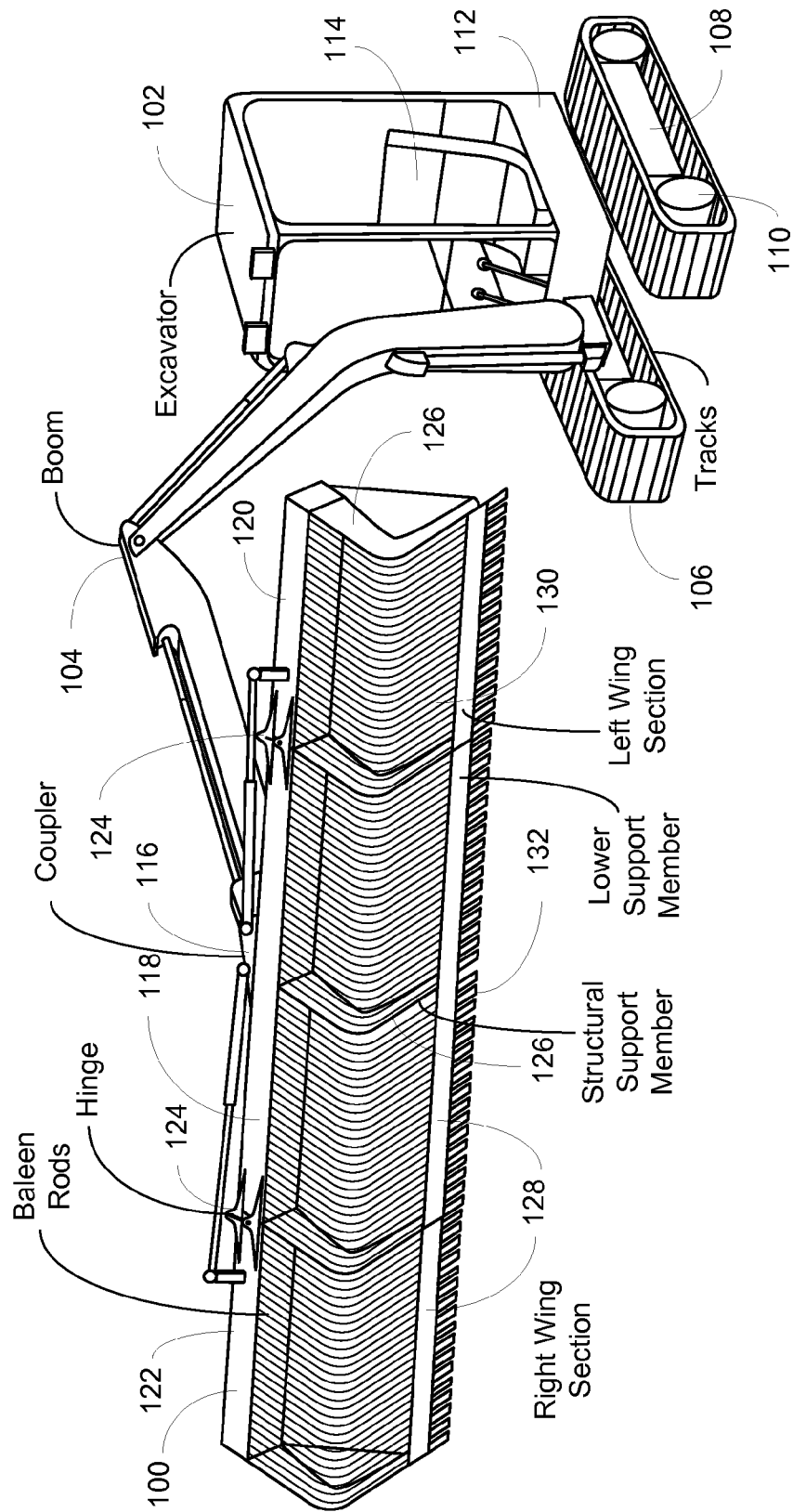
FIG. 1 is a perspective view of the main section, left wind and right wings of the vegetation removal rake connected to an excavator.

FIG. 1 is a perspective view of the vegetation removal system as connected to a tracked excavation 102. The excavator 102 may come in a wide variety of sizes. The smaller excavators are often called mini or compact excavators. Engines in excavators (not shown) drive a plurality of hydraulic pumps (not shown) for operating a variety of the mechanical devices on the excavator such as the boom and any attachments connected to the boom 104.

The two main components of an excavator are the undercarriage and the house. The undercarriage includes the tracks 106, track frame 108 and final drives 110 which typically have a hydraulic motor and gearing providing the drive force to the individual tracks 106. The excavator's house 112 includes the operator cub 114, counterweight (not shown), engine (not shown), fuel (not shown) and hydraulic oil tanks (not shown). The house 112 attaches to the undercarriage by way of a center pivoting point thus allowing the excavator machine to rotate through 360° unhindered.

A main boom 104 attaches to the house 112 and can be one of three different configurations: mono booms that typically have no movement apart from straight up and down: knuckle boom 104 which can move left and right in line with the machine; and a third option that has a hinge at the base of the boom allowing the boom to hydraulically pivot up to 180° independently relative to the house 112, however this is generally available only to compact excavators.

Attached to the boom 104 is a coupler 116 that connects the vegetation removal rake 100 to the boom 104 and to the excavator 102. The vegetation removal rake 100 comprises a main rake section 118 as well as a left wing section 120 and a right wing section 122. The left and right wing sections 120 and 122 connect to the main rake section 118 by hinges 124. The vegetation removal rake 100 has structure support members 126 that provide structural integrity to the rake 100. A lower support member 128 provides structural support for the bottom section of the vegetation removal rake 100 and connects the baleen rods or tines 130 with the rake teeth 132.

Figure 2:
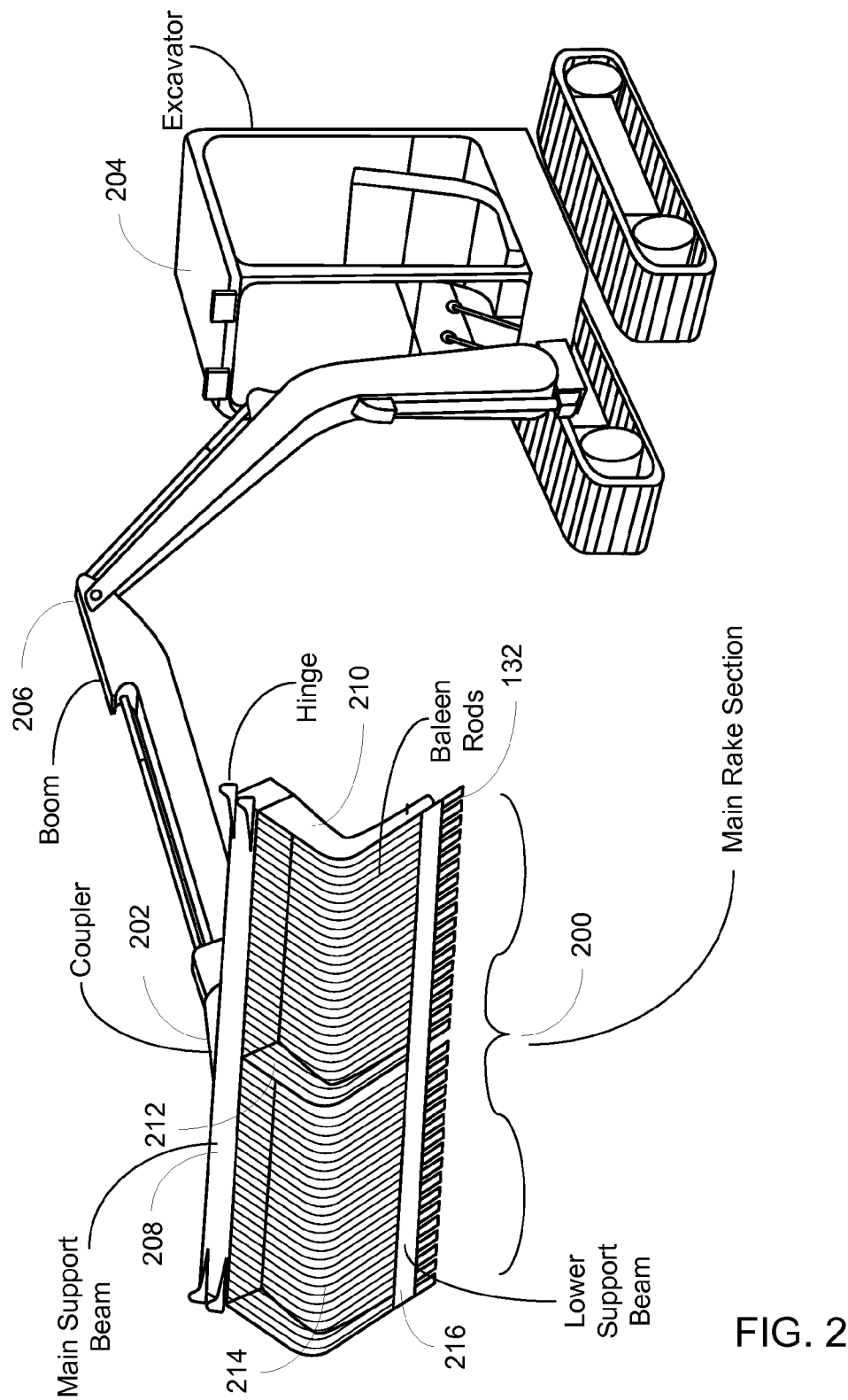
FIG. 2 is a perspective view of only the main section of the vegetation removal rake connected to an excavator.

Larger vegetation removal rakes 100 will require larger excavators 102. However, in some applications a smaller vegetation removal system will be more ideally suited. In those applications, a vegetation removal rake can be made smaller by removal of the wing sections 120 and 122. Employment of such a reduced size vegetation removal rake is shown in FIG. 2 where the left and right wing sections 120 and 122 are removed. The main rake section 200 is connected by a coupler 202 to an excavator 204 boom 206. In such a configuration, there is no need for the mechanism to open or close the wing sections 120 and 122. The main support beam 208 stabilizes the outer support edge members 210 and the center support member 212 to provide structural integrity to the vegetation removal rake. Baleen rods or tines 214 connect the main support beam 208 with the lower support beam 216 and allow for the passage of water and silt through the vegetation removal rake during operation.

Figure 3:
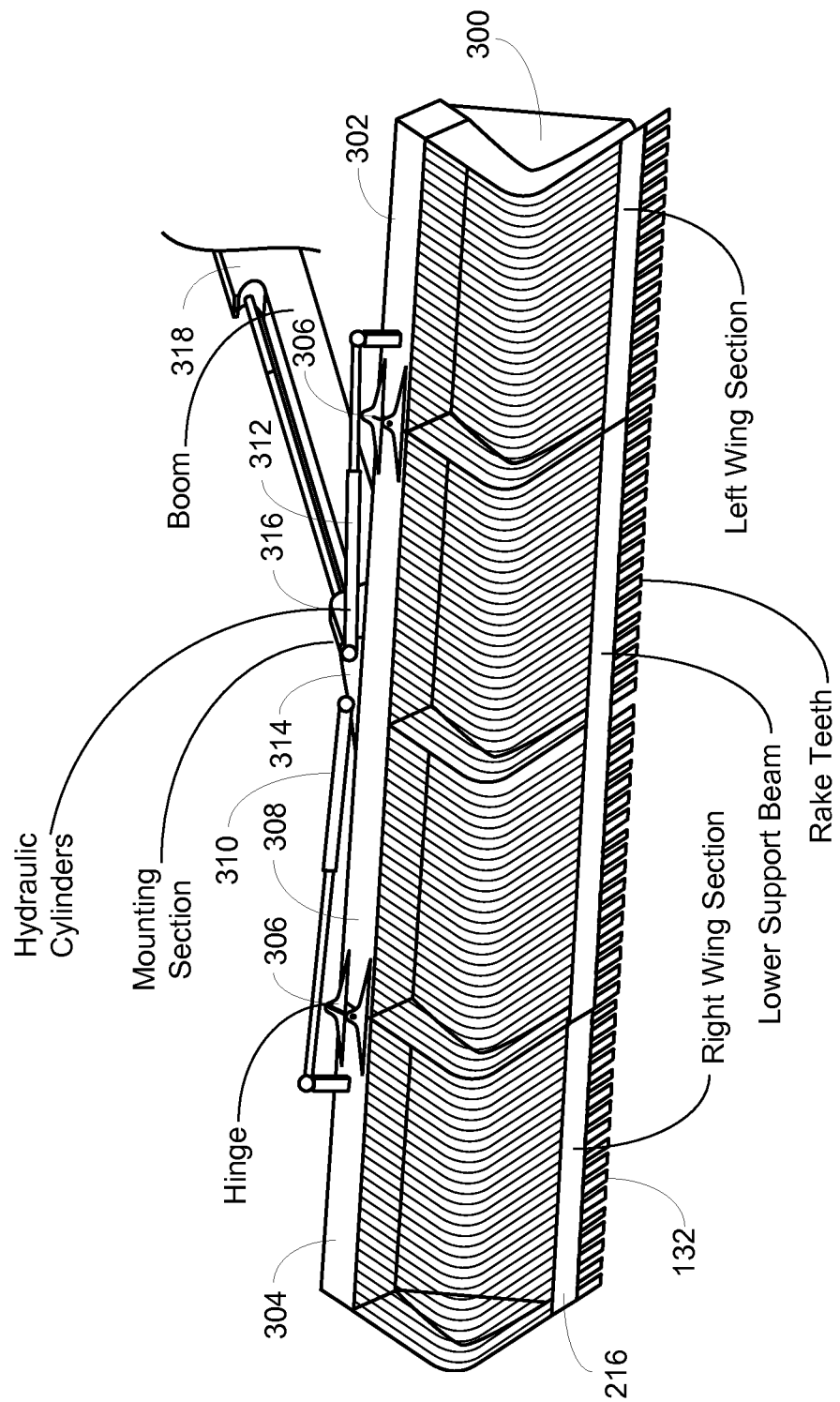
FIG. 3 is a perspective view of the main section, left and right wings of the vegetation removal rake that employs a hydraulic system employed for raising and lowering the left and right wing sections.

FIG. 3 is a perspective view of the main section, left and right wings of the vegetation removal rake 300 that employs an embodiment illustrating a hydraulic system employed for raising and lowering the left 302 and right wing sections 304. Another embodiment for raising and lowering the left 302 and right wing sections 304 include manually opening and closing the wings assuming the wing sections are small and light enough for workers to open and close. Alternative embodiments also include the use of hydraulic, electric and pneumatic actuators (discussed in FIG. 10) as well as electric motors.

Hinges 306 allow the wing sections to pivot along the main support member 308 so that the wing sections 302 and 304 can fold up into a more compact unit. In this embodiment, hydraulic cylinders 310 and 312 are connected to the main support member 308 or the mounting section 314 of the rake where the coupler 316 connects to the boom 318. The location of the hydraulic cylinders 310 and 312 may be located as shown in the figures or repositioned in order to remove any binds which may want to pull the wing sections 302 and 304 towards the excavator cab. However, an alternative but as compact vegetation removal rake embodiment could be configured such that the wing sections 302 and 304 are rotated forward forming a "U" shaped arrangement so that the vegetation removal rake is smaller in size when transporting the vegetation removal system.

Figure 4:
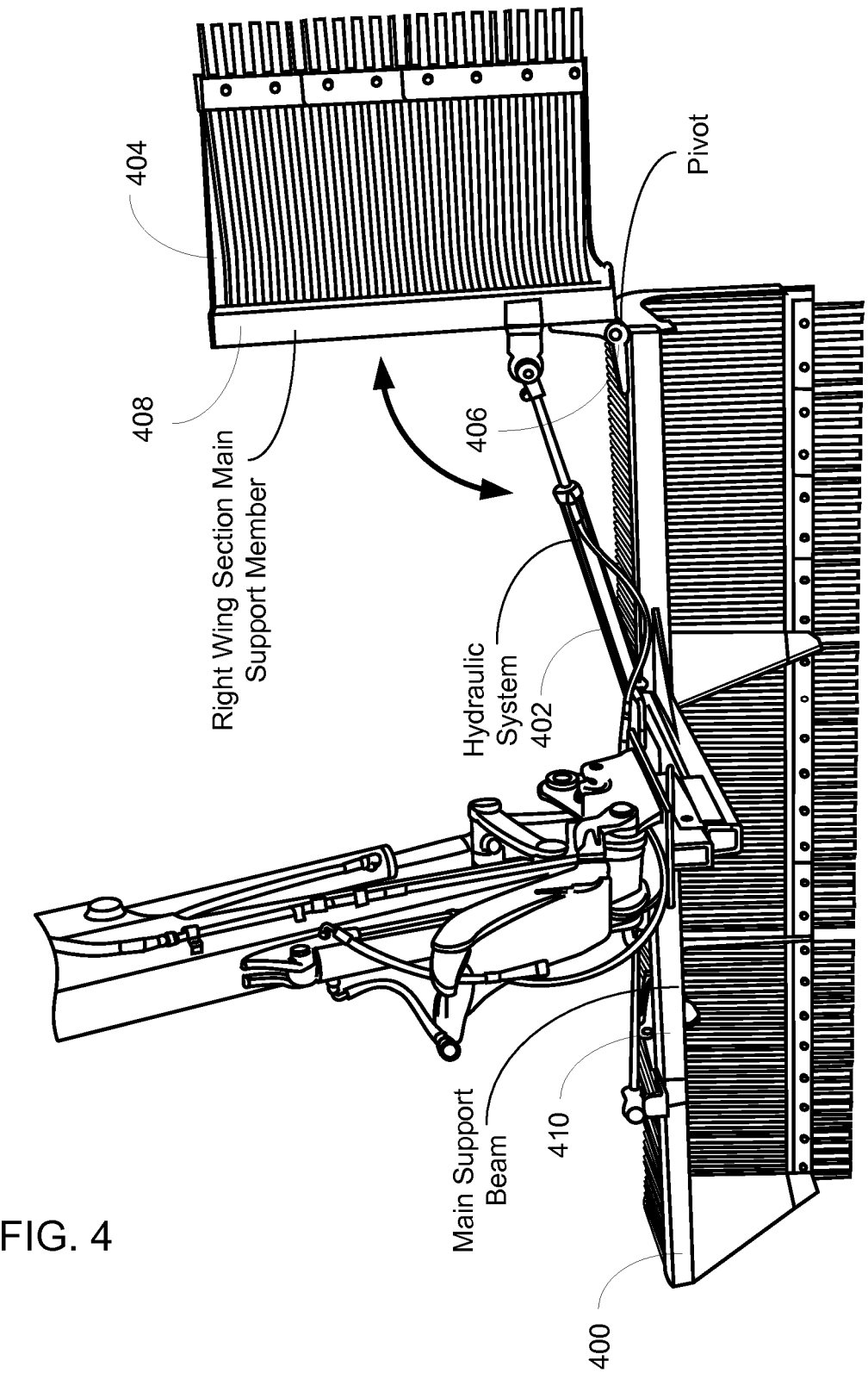
FIG. 4 is a perspective view of the main section, left and right wings of the vegetation removal rake that employs a hydraulic system that has raised the right wing section.

FIG. 4 is a perspective view of the main section, left and right wings of the vegetation removal rake 400 that employs a hydraulic system that has raised the right wing section 404. The right wing section 404 pivots along a pivot point or hinge 406 so that the right wing section's main support member 408 is positioned such that it is parallel and adjacent to the main support beam 410. To assist the movement of the right wing section 404, a hydraulic system is positioned alone the main support beam 410 and connects to the right wing section 404 so that when the hydraulic system is actuated, the right wing section 404 rotates on the pivot point or hinge 406 so that the right wing section 404 is positioned in an angle to the main section of the vegetation removal rake 400 or in a stowed position on top of the main section of the vegetation removal rake 400.

Figure 5:
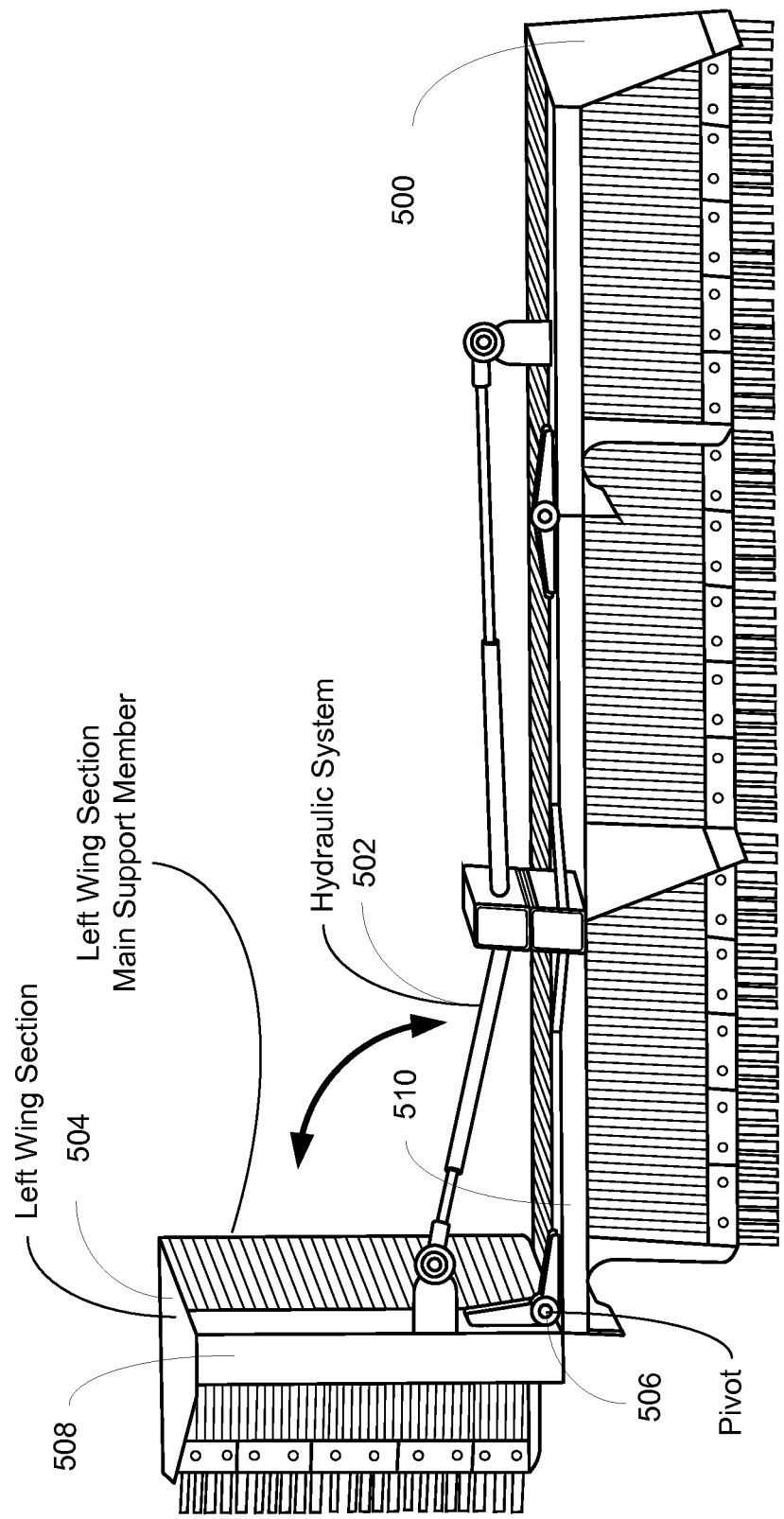
FIG. 5 is a front view of the main section, left and right wings of the vegetation removal rake that employs a hydraulic system that has raised the left wing section.

FIG. 5 is a front view of the main section, left and right wings of the vegetation removal rake 500 that employs a hydraulic system 502 that has raised the leftl wing section 504. The left wing section 502 pivots along a pivot point or hinge 506 so that the left wing section's main support member 508 is positioned such that it is parallel and adjacent to the main support beam 510.

Figure 6:
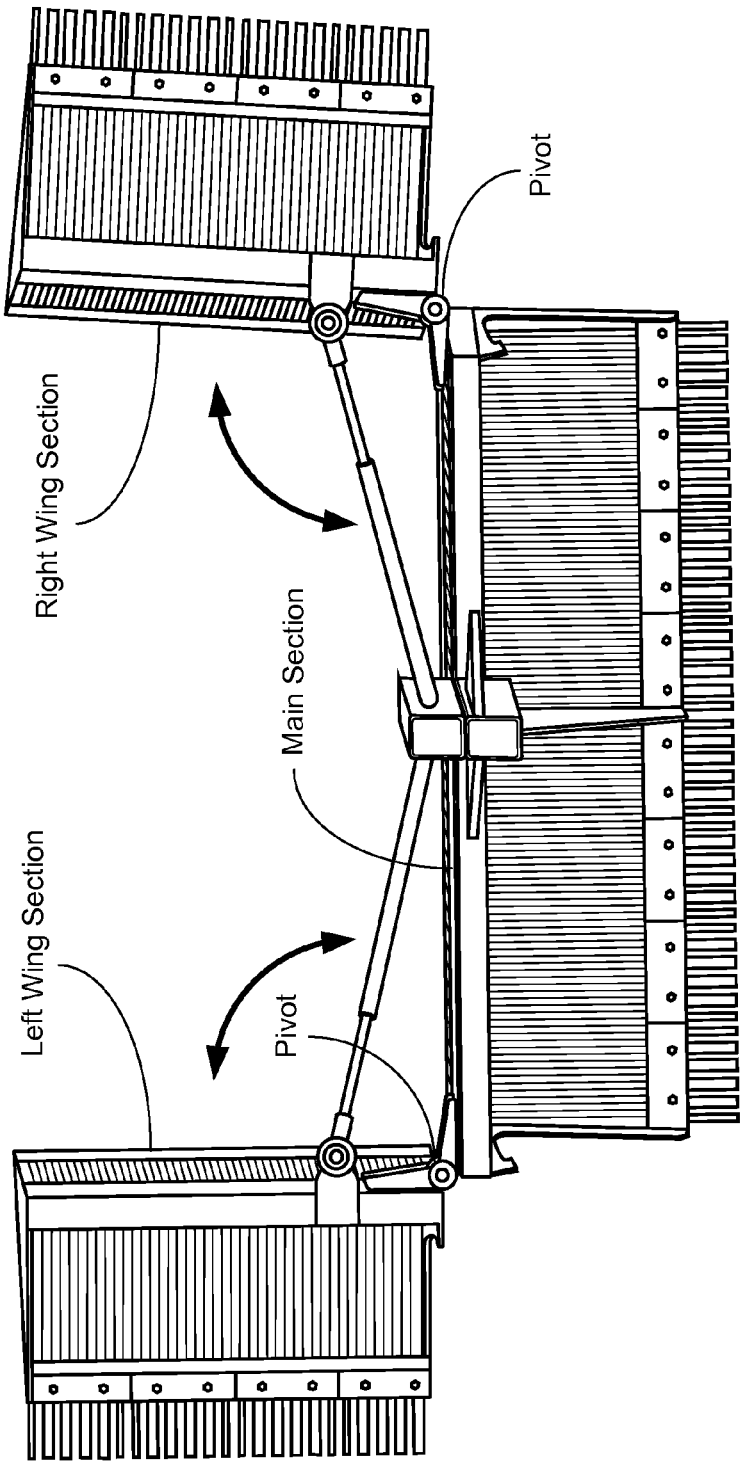
FIG. 6 is a front view of the main section, left and right wings of the vegetation removal rake that employs a hydraulic system that has raised both the left and right wing sections.

FIG. 6 is a front view of the main section, left and right wings of the vegetation removal rake that employs a hydraulic system that has raised both the left and right wing sections for folding up into a compact arrangement. Both wing sections may be moved into the closed or compact position individually or simultaneously for balancing and weight distribution purposes.

Figure 7:
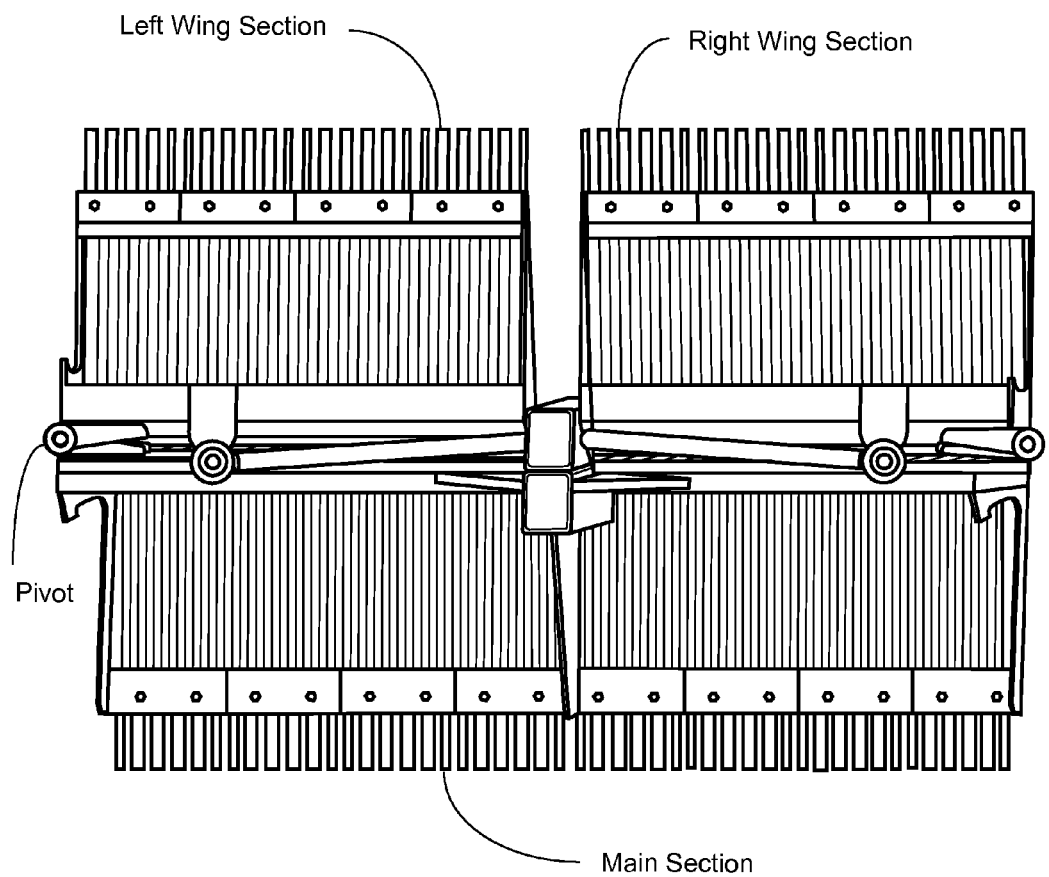
FIG. 7 is a front view of the main section, left and right wings of the vegetation removal rake that employs a hydraulic system that has raised both the left and right wing sections into the folded position for compact storage or transportation.

FIG. 7 is a front view of the main section, left and right wings of the vegetation removal rake that employs a hydraulic system that has raised both the left and right wing sections into the folded and compact position for compact storage or transportation. The left and right wing sections may also be closed into this compact position if the excavator operator desires to remove vegetation in an area where the extended reach of the wider wing sections are not needed. Once in the compact arrangement as illustrated in FIG. 7, the vegetation removal rake may be transported without decoupling the vegetation removal rake from the boom of the excavator thus saving time when transporting the excavator from one location to another location.

In a standard configuration, the main section of the vegetation removal rake could be designed to be eight (8) feet wide and each wing section four (4) feet wide. This would allow a sixteen (16) foot wide rake to be easily configured and reduced in size to an eight (8) foot wide rake which would be optimal for efficient operation on a job site as well as narrow enough to be easily transported by trailer from job site to job site.

Figure 8:
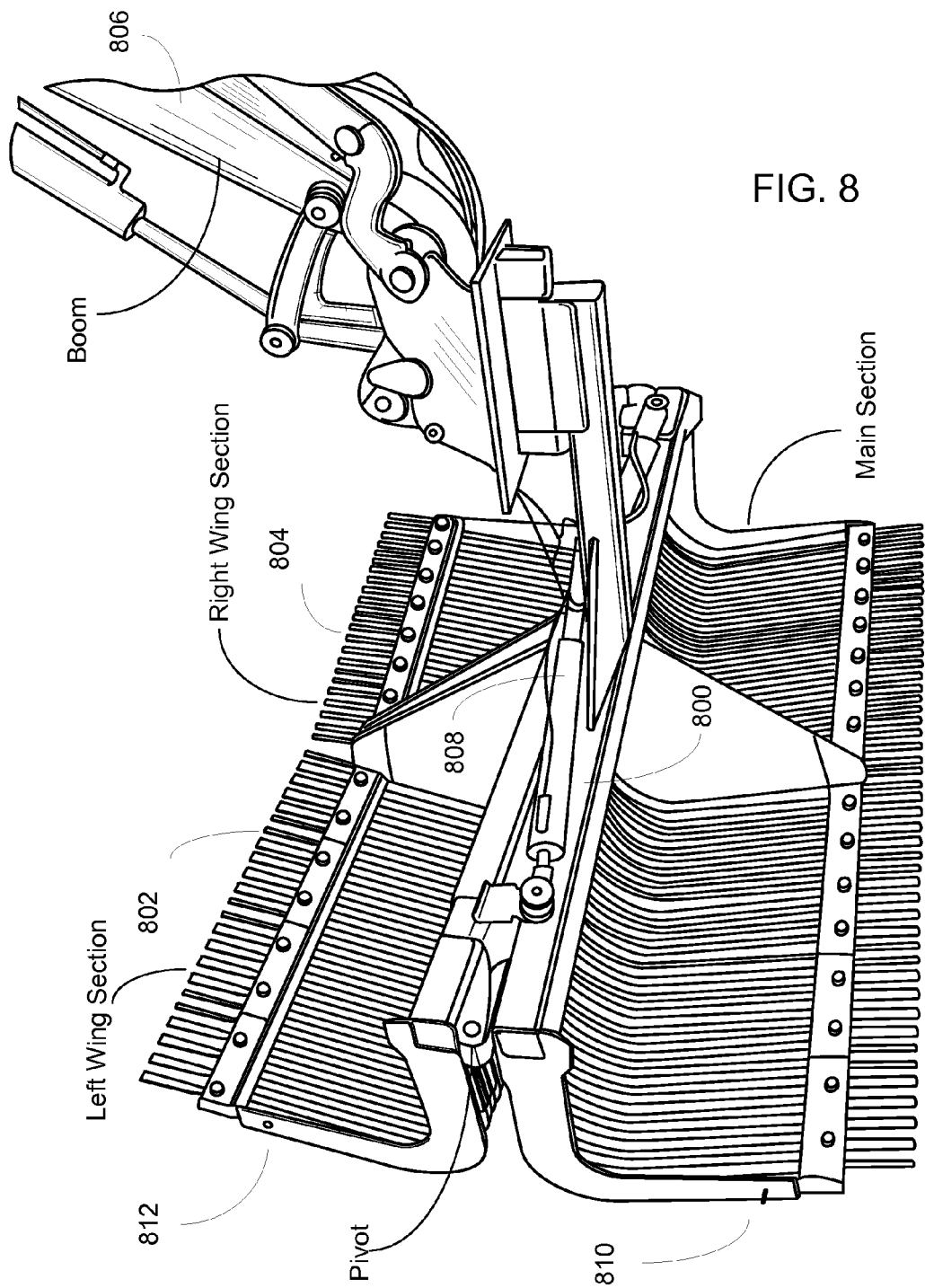
FIG. 8 is a perspective view of the main section, left and right wings of the vegetation removal rake connected to an excavator boom and employing a hydraulic system that has raised both the left and right wing sections into the folded position for compact storage or transportation.

FIG. 8 is a another perspective view of the main section 800, left 802 and right wings 804 of the vegetation removal rake connected to an excavator boom 806 and employing a hydraulic system 808 that has raised both the left 802 and right wing sections 804 into the folded position for compact storage, use or transportation. For additional stabilization when the left 802 and right wing sections 804 are lowered into position, pin 810 is positioned so that it mates with hole 812 so that the pin 810 and hole 812 connection provides structural support with the main section 800 and the left 802 and right wing sections 804 are lowered and the vegetation removal rake is under structural stress as it moved through vegetation and soil and drag forces are exerted on the rake. The pin 810 and hole 812 arrangement is just one embodiment that may be employed to add structural integrity to the vegetation removal rake and other mechanisms may be employed to one skilled in the art.

Figure 9:
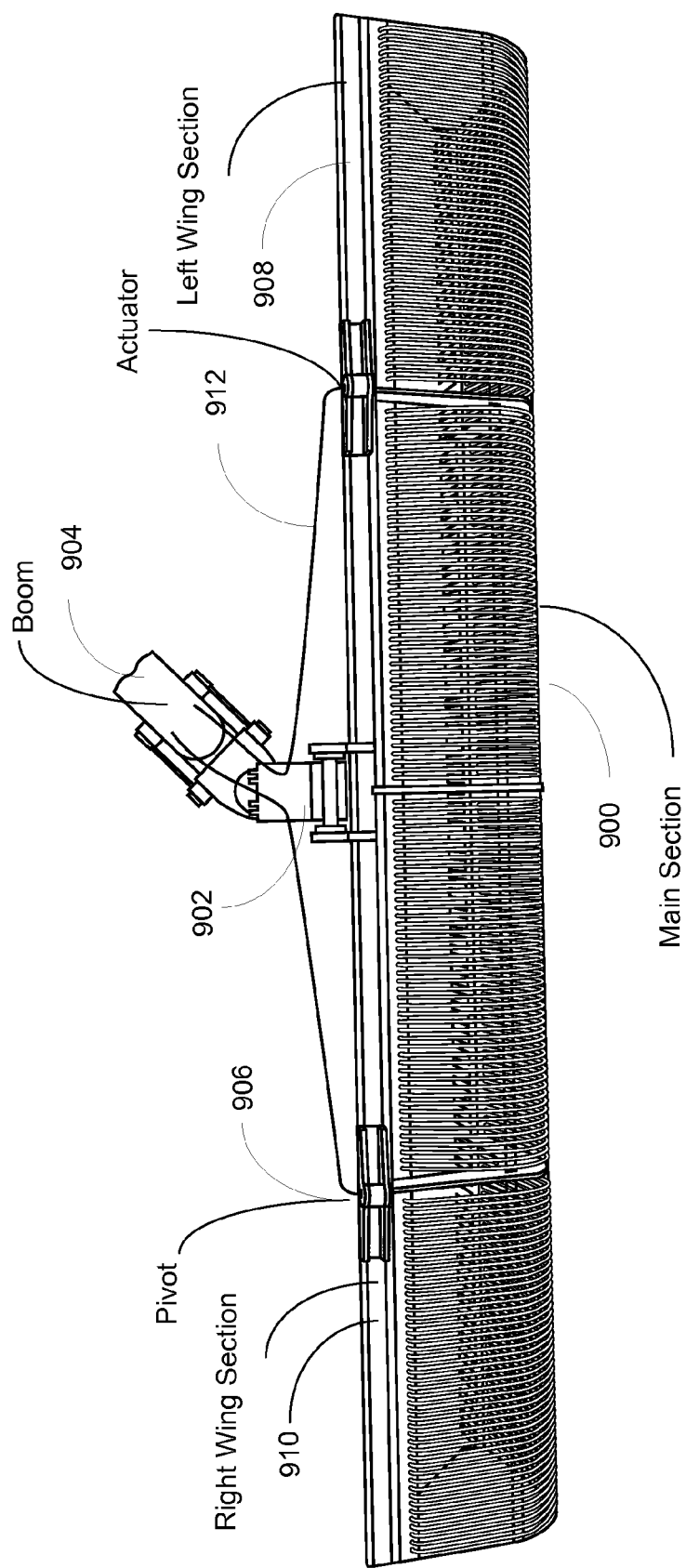
FIG. 9 is a front view of the vegetation removal rake connected by a hydraulic rotary actuator coupler to an excavator boom.

FIG. 9 is a front view of the vegetation removal rake 900 connected by a hydraulic rotary actuator coupler 902 to an excavator boom 904 and employing the use of hydraulic, pneumatic or electric actuators 906 to facilitate the opening and closing of the left 908 and right wing sections 910. The hydraulic, pneumatic or electric actuators 906 may be supplied with hydraulic fluid, air or electricity via lines 912. The hydraulic rotary actuator coupler 902 may be a commercially available coupler such as one provided by Helac Corporation of Enumclaw. Washington (see Helac PowerTilt product line). Such a rotary hydraulic actuator connects the vegetation removal rake 900 with the excavator boom 904 such that the rake 900 can pivot in multiple dimensions allowing for easy and smooth transitions of the rake orientation.

Figure 10:
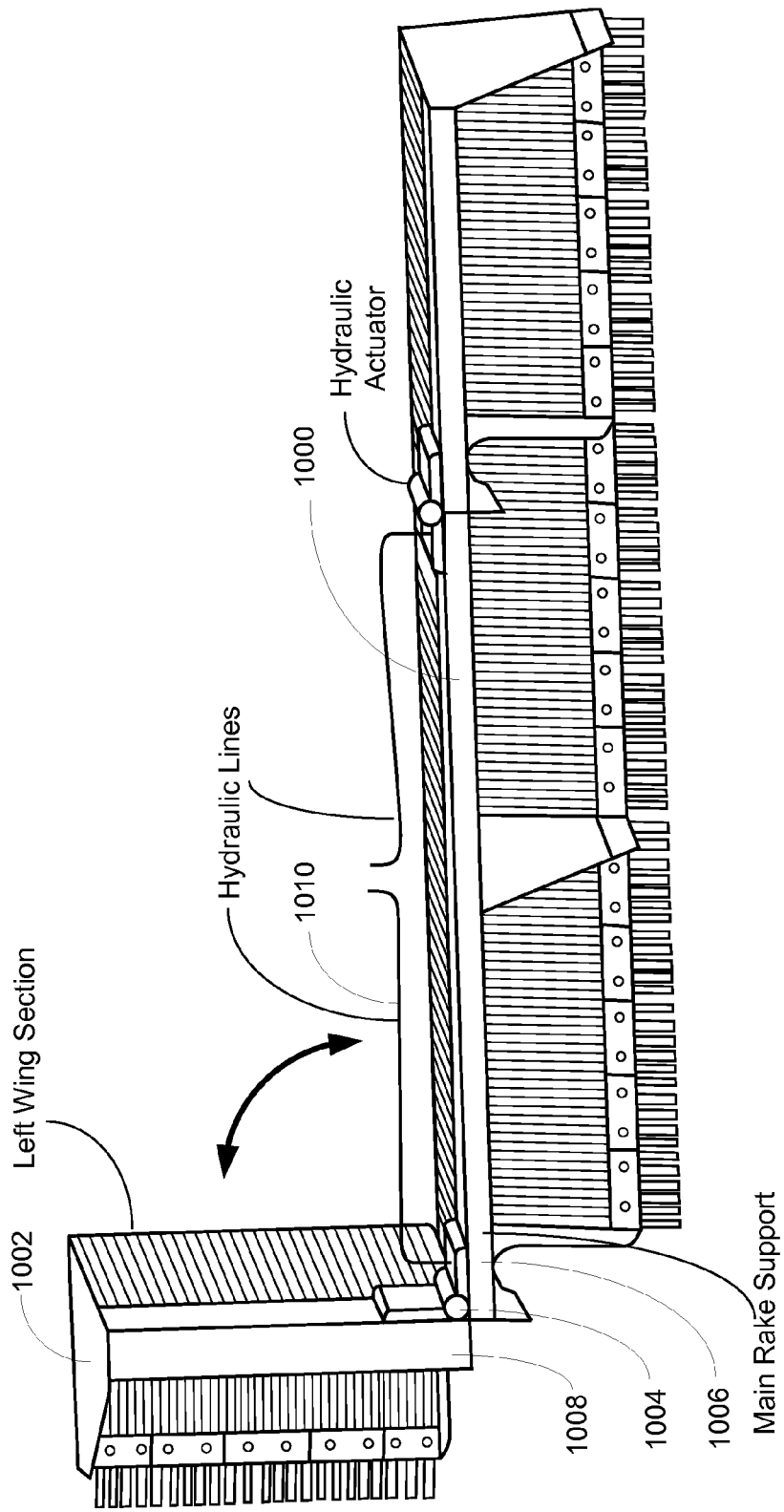
FIG. 10 is a front side view of the vegetation removal rake with the left wing section folding up and actuators located on the top part of the vegetation removal rake for use in folding the left and right wing sections up and down.

FIG. 10 is a front side view of the vegetation removal rake 1000 with the left wing section 1002 folding using an actuator 1004 located on the top pan of the vegetation removal rake main rake support 1006 and the left wing section 1008. Hydraulic lines 1010 connect the hydraulic actuators 1004 with the boom lines (not shown) that connect with the hydraulic pump located on the excavator. In alternative embodiments, pneumatic actuators (not shown) will connect to an air compressor (not shown) or electric lines (not shown) will connect to an electric power source (not shown) to power the actuators so that the wing sections can open and close.

Figure 11:
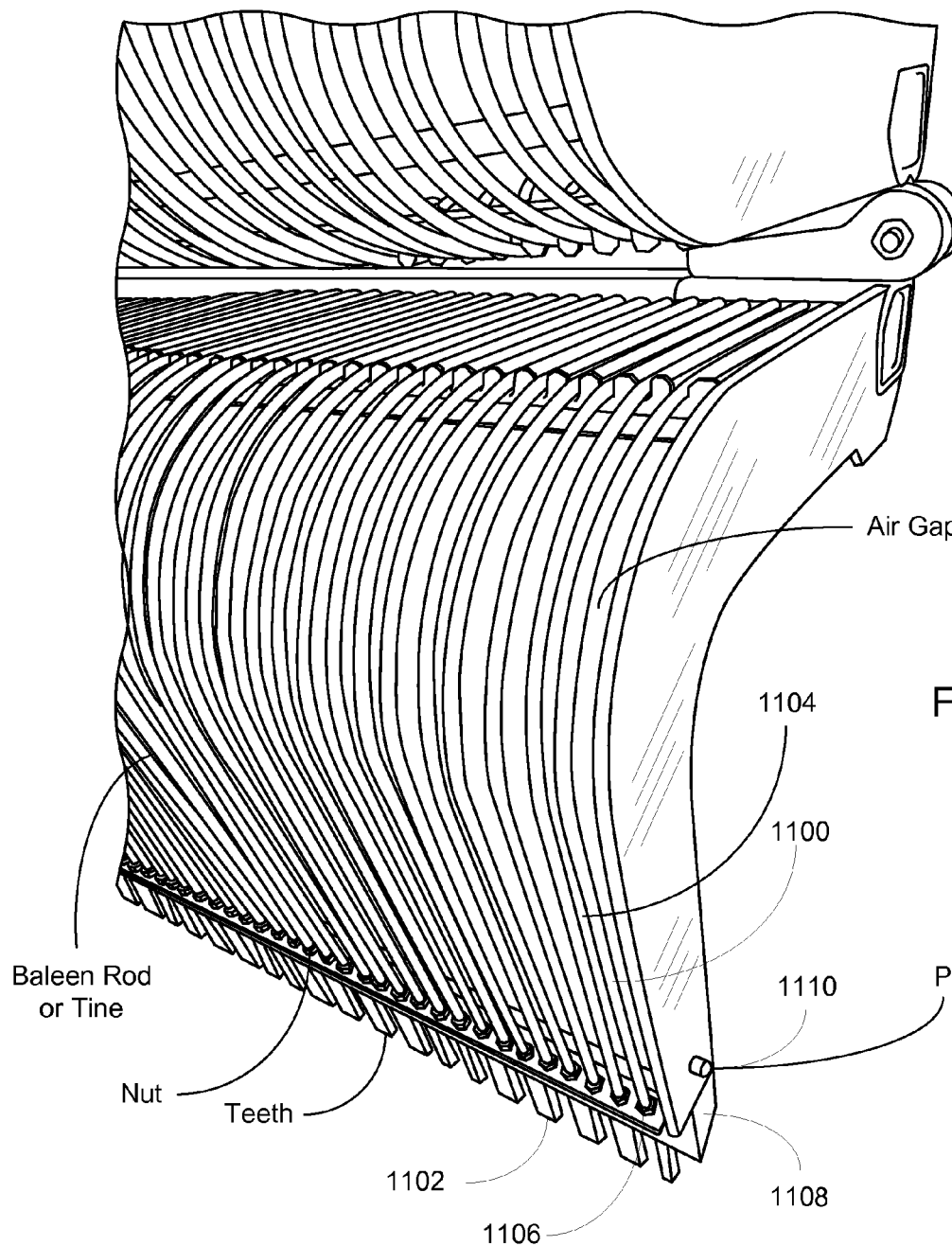
FIG. 11 is a perspective view of the baleen rods or tines attached to the frame member.

FIG. 11 is a perspective view of the vegetation removal rake illustrating the baleen rods or tines 1100 and the rake's teeth 1102. The baleen rods or tines 1100 may be constructed out of steel and provide flexible structural support for the rake while allowing water, silt and soil to pass through the air gaps 1104. The lower end of the baleen rods or tines 1000 may be threaded and nuts 1106 connect the baleen rods or tines 1000 into the lower support member 1108. Pin 1110 is typically mounted on the main rake system and mates with a hole on the right or left wing section so that when the right or left wing is extended the pin 1110 and hole (not shown) locks the wing sections in place when the wing sections are in their down position relative to the main rake section.

Figure 12:
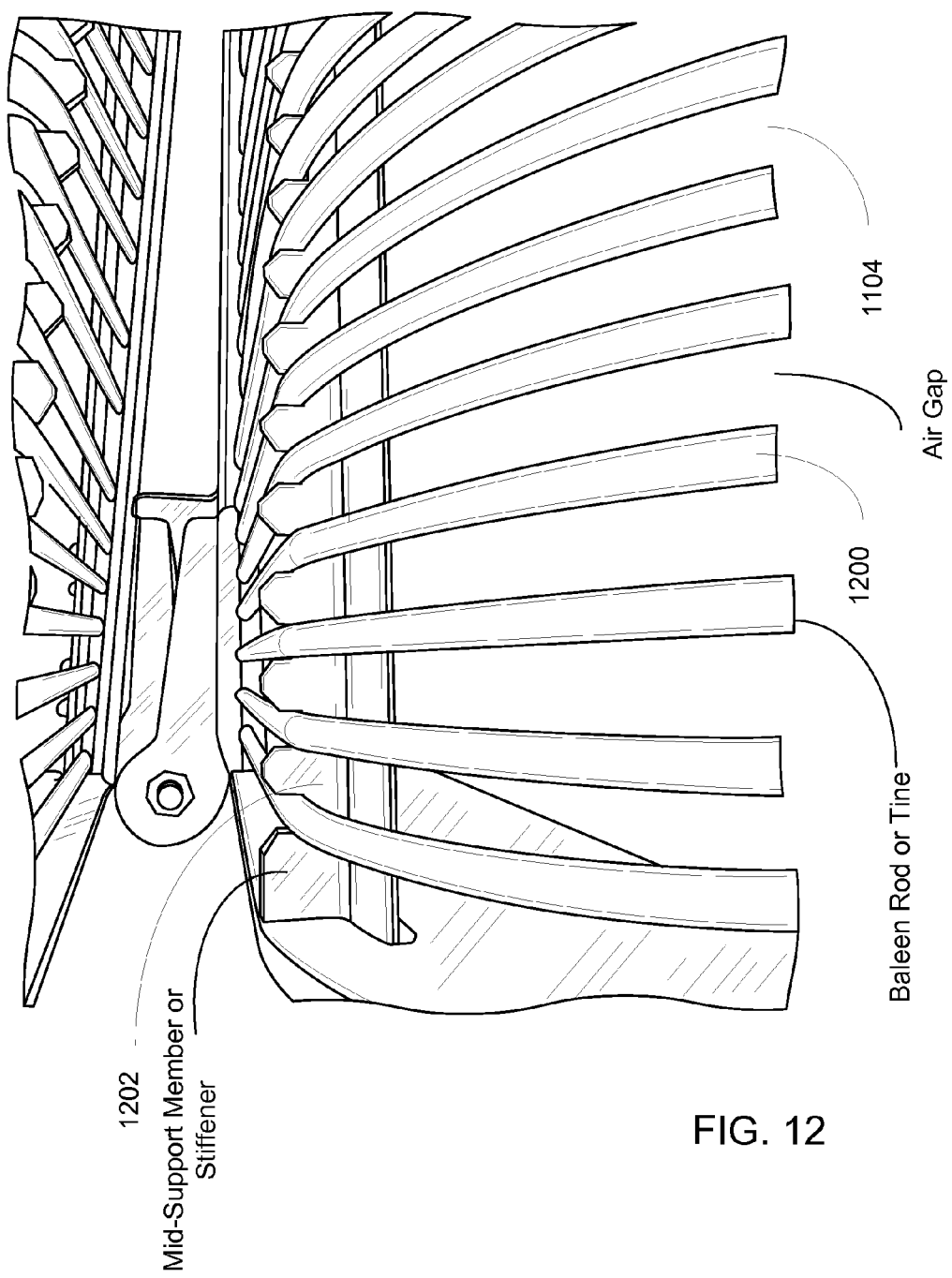
FIG. 12 is a rear view of the vegetation removal rake with the left wing section folded into the compact position and a hinge located on the top pan of the rake.

FIG. 12 is a perspective view of the vegetation removal rake in the compact configuration illustrating the baleen rods or tines 1200 on the vegetation removal rake with mid-support member or tine stiffener 1202 providing additional structural integrity as well as flexibility of the overall rake structure. In larger vegetation removal rakes more than one mid-support members or tine stiffener 1202 may be used. In one embodiment, the mid-support member or tine stiffener 1202 may be designed such that the baleen rod or line 1200 is positioned in a half circle, recessed area on the mid-support member or tine stiffener 1202 and a cap member may be employed that is positioned over the top side of the mid-support member 1202 encasing the baleen rod or line 1200 in two half circular structures (not shown).

Figure 13:
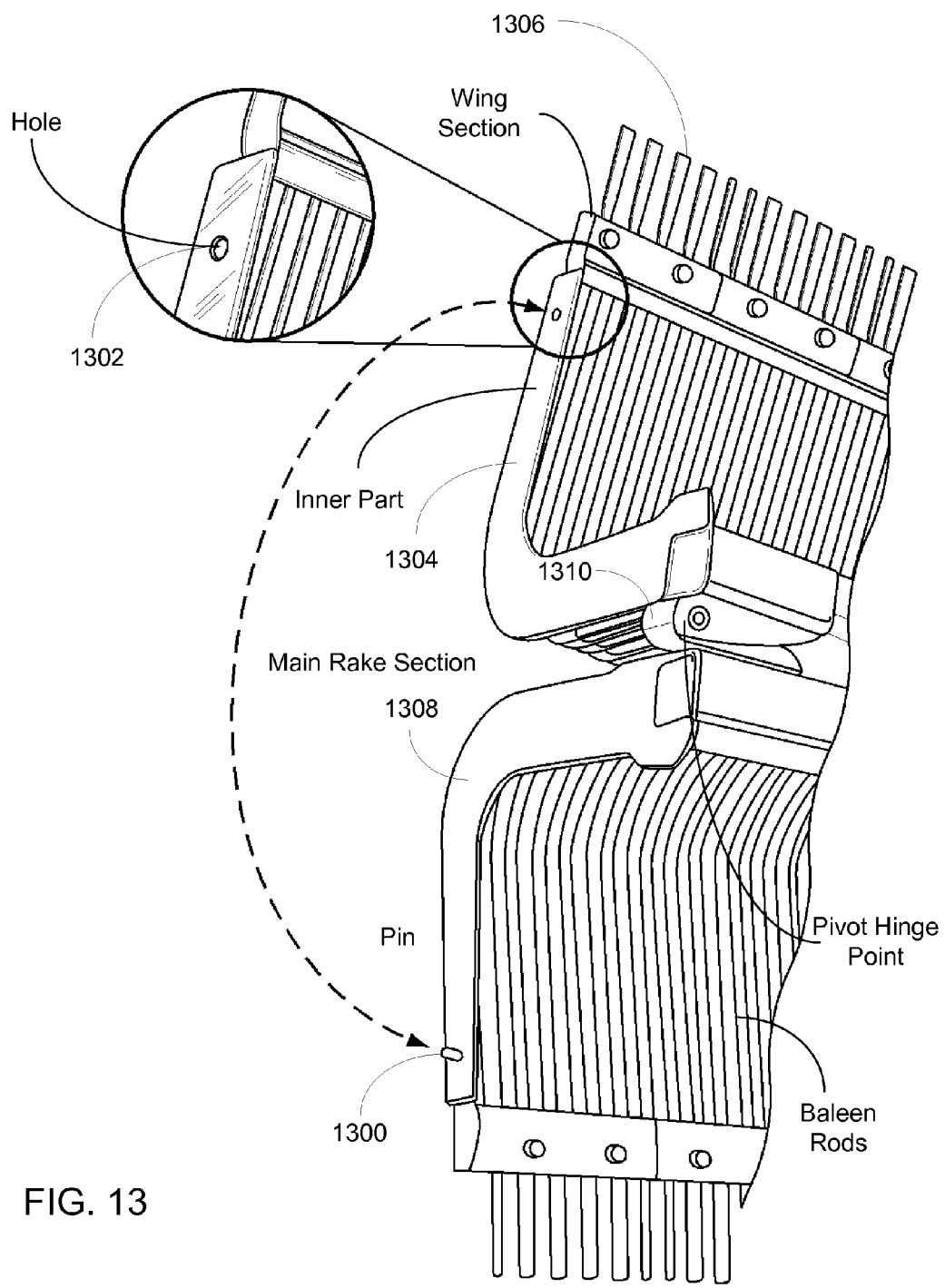
FIG. 13 is a perspective view of the vegetation removal rake illustrating the pin and hole system to lock the wing sections in place when the wing sections are in the down position.

FIG. 13 is a perspective view of the vegetation removal rake illustrating the pin 1300 and hole 1302 system to lock the wing section 1304 in place when the wing section is in the down position relative to the main rake section 1306. Stabilizing hole 1302 may be located in the inner part 1304 of the wing section 1306. When the wing section 1306 and the main rake section 1308 are mated together the stabilizing pin 1300 from the main rake section 1308 inserts into the hole 1302 and locks the two sections of rake together. This pin in hole connection provides structural rigidity when the rake is in operation and minimizes the structural stress on the pivot hinge point 1310. The pin can be bolted or welded to the main rake section 1308. Conversely, the pin and hole locking system may be reversed with the pin 1300 located on the wing section 1306 and the hole located on the main rake section 1308. Other locking mechanisms may be used that are well known in the art so that structural rigidity can be maintained between the wings and main rake sections. In larger vegetation rakes, a plurality of pin in hole connects may be used.

Figure 14:
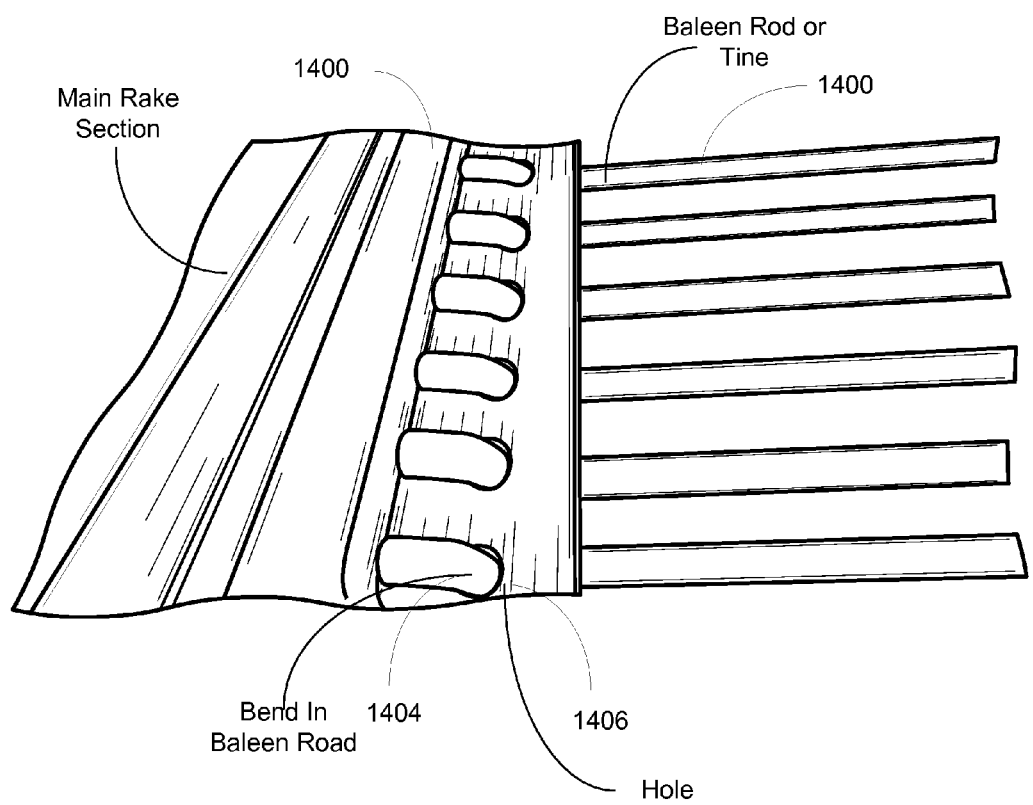
FIG. 14 is a perspective view of the baleen rods or tines attached to the frame member.

FIG. 14 is a perspective view of the baleen rods or lines 1400 attached to the main rake support member 1402. The baleen rods or tines 1400 are slightly bent 1404 in two spots and positioned in a hole 1406 located on the edge of the main rake support member 1402. In an alternative embodiment, the baleen rods or tines 1400 may be welded or bolted onto the main rake support member 1402. However, the embodiment shown in FIG. 14 provides for a significant flexibility of the vegetation rake as it pulls plants and trees out of the soil or silt without the shortcomings of shearing off bolts or breaking welds.

Figure 15:
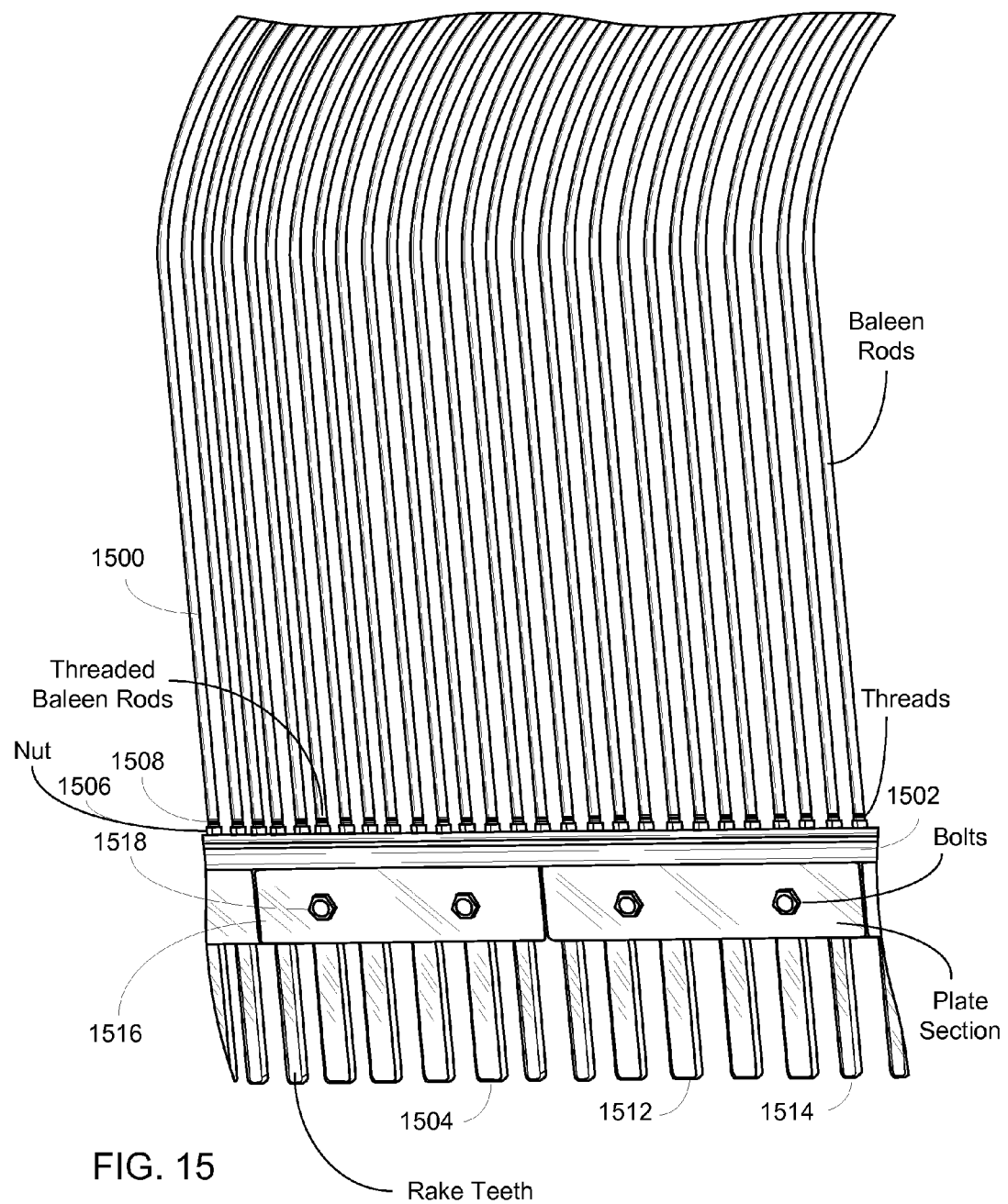
FIG. 15 is a front view of the vegetation removal rake illustrating the baleen rods or tines attached to the bottom stabilizing member with the attached rake teeth.

FIG. 15 is a front view of the vegetation removal rake illustrating the baleen rods or tines 1500 attached to the bottom stabilizing member 1502 with the attached rake teeth 1504. The baleen rods or tines 1500 may be connected to the bottom stabilizing member 1502 by bolts 1506 securing threaded 1508 baleen rods or tines 1500. The rake teeth 1504 may be positioned by adding a plurality of even sized teeth or teeth of varying thickness such as 1512 and 1514. Likewise the teeth 1504 spacing may be regular or irregularly spaced apart depending upon the type of vegetation that the excavator operator seeks to remove. Also, certain vegetation types may require longer or narrower teeth while other types may require shorter or thicker teeth in order to achieve optimum results. The teeth 1504 may be mounted in plate sections 1516 that can be bolted 1518 to the bottom stabilizing member 1502. By arranging the teeth 1504 and mounting them on the plate sections 1516, the teeth 1504 can be easily changed out if job conditions change or if teeth get broken during the vegetation removal process.

FIG. 16 top view of the hydraulic system connecting the hydraulic lines 1600 to the hydraulic cylinders or actuators that provide for the wings to move on the vegetation removal rake. Coupler 1602 connects the vegetation removal rake 1604 with the excavator boom 1606. The hydraulic layout can be shielded (not shown) so that the vegetation does not get stuck in the hydraulic lines potentially causing them to break during the vegetation removal process. The hydraulic lines 1600 attach to the hydraulic cylinders or actuators and connect to the hydraulic lines that are located on the excavator boom 1608.

FIGS. 17 and 18 illustrate the vegetation removal rake as used in two example applications. In FIG. 17, the vegetation removal rake 1700 is used to remove vegetation along an irrigation canal 1702. Periodically, grass, weeds, small trees such as alder trees, lily pads and other vegetation (not shown) grow along the banks of irrigation canals 1702 impeding the flow of water. If left unchecked, this vegetation will eventually chock off the flow of water in the canal. Also, silt may settle out of the water and accumulate also impeding the efficient flow of water in the irrigation canal 1702.

To remove this unwanted vegetation, an excavator 1704 is positioned along one side of the irrigation canal bank 1706. The excavator 1704 can then dig along the sides 1708 and bottom 1710 of the canal removing any of the vegetation that may be impeding the flow of water. For higher productivity, the tracks 1712 of the excavator 1704 may be positioned parallel to the flow of water in the irrigation canal 1702 (not shown) such that the excavator can move along the irrigation canal 1702 as the vegetation and silt is removed.

Sensors may be attached to the vegetation removal rake 1700 or the excavator 1704 to provide situational awareness for the excavator operator. For example, global positioning system ("GPS") sensor(s) 1714 may be programmed to provide position awareness relative to the geographic location of the excavation. For example, the GPS sensors may be programmed so that the excavator operator maintains a certain course along an irrigation canal 1702 that is completely overgrown with vegetation. Other sensors (not shown in this Figure) may assist the operator in maintaining a constant grade for the irrigation canal 1702 so that areas are minimize where the water gradient is steep followed by areas where the water flows on a flat or reverse grade. This will help minimize areas along the irrigation canal 1702 where sediments can erode due to the faster current and areas of flat or reverse gradient that allow sediment deposits to settle out of the irrigation water due to the slower water flow rate.

FIG. 18 illustrates the removal of vegetation 1800 from lakes and ponds where the excavator 1802 is mounted on a boat or barge 1804 and positioned so that the vegetation removal rake 1806 can scrape the bottom 1808 of the body of water 1810. In canals, lakes, ponds or other operating environments where the vegetation removal rake 1806 is submerged under deep water, it is difficult for the evacuator operator to determine the position of the vegetation removal rake 1806 relative to the bottom 1808 of the body of the water 1810. Thus, a water depth sensor 1812 can send out signals 1814 and receive return signals 1816 from the bottom 1808 or from obstacles 1818 to determine the water depth and the location and size of any obstacles 1818. This depth sensor 1812 may also be capable of supporting a water depth sensor such as a sonar device or a side scan sonar device capable of transmitting signals 1820 that can map the contour of the bottom 1808, provide gradient information, detection of obstacles, as well as completeness of the vegetation removal information to the evacuator operator.

Additional sensors 1822 may be attached to the rake and location points on the excavator boom 1822 so that the excavator operator can determine the position and orientation of the rake 1806 relative to the bottom 1808 as well as the orientation of the rake 1806 relative to the bottom surface contour orientation 1824. In other words, if the bottom 1808 sloped off gradually or steeply, this information would allow the excavator operator to properly position the vegetation removal rake 1806 accordingly. In other words, the sensors can determine whether the vegetation removal rake is extended, tilted to one side or another, etc. Other sensors may be added to assist the operator with maintaining consistent grade. These sensor systems when connected to computer systems can provide improved guidance, increased accuracy when implementing the vegetation removal plan and increased safety by warning excavator operators of potential overhead hazards such as electrical lines or submerged hazards such as underwater cables and pipelines.

Likewise, if a submerged rock or other underwater obstacle 1818 is located, this information would allow the excavator operator to maneuver the vegetation removal rake 1906 close to the submerged, rock or obstacle 1818 while minimizing the chances that the rock or obstacle 1818 would damage the vegetation removal rake 1806. These sensors 1822 can determine the orientation position of the vegetation removal rake 1806 plus input of the rake dimensions into a computer in the excavator operator's cab so that the operator can manually or automatically allow on board computers to adjust the position of the vegetation removal rake 1806 relative to the water bottom 1808 or obstacle 1818 providing a more uniform removal of the vegetation with minimal disturbance to the water bottom 1808 area and minimizing the potential for damaging the vegetation removal rake 1806. In some circumstances, it will be important for the computer to override the manual commands of an excavator operator so that the vegetation removal rake does not come into contact with an obstacle.

FIG. 19 is a block diagram of the process steps for inputting map coordinates and irrigation gradient into a computer to assist in the removal of vegetation by the vegetation removal rake excavator. The computer may be located in the excavator or may be located away from the excavator but capable of relaying commands to the excavator via a wired or wireless communication path. The map coordinates of the area where the vegetation will be removed 1900 is input into a computer's memory for later retrieval by a software program. In addition to the map area where the vegetation is desired to be removed the excavator operator can select areas where the excavator is prohibited from traveling such as across weak bridges that would not support the excavator or the location of low hanging power lines that may create a safety hazard to the excavator operator.

Also, the desired gradient slope of the irrigation canal 1902 or area where the vegetation will be removed can also be input into the computer. Additional input variables may include the vegetation type that is in the area such as weeds, lily pads, alder trees, etc. as well as the height of the vegetation. These variables may be useful in calculation the estimated time that it will take an excavator operator to remove the vegetation a given area.

The excavator computer may also be capable of receiving global positioning system ("GPS") signals 1904 so that the excavator's location can be plotted relative to the location map coordinates where the vegetation is selected for removal. In addition, location of other sensors on the excavator, boom or vegetation removal rake as well as input of the vegetation removal rake's size dimensions can assist in the accurate calculation 1906 of the excavator and the vegetation removal rake's position by the computer. Via a display in the excavator, the computer can output the position of the excavator in relationship to a map illustrating the area where the vegetation is to be cleared versus the area that has already had the vegetation removed 1908.

The excavator's productivity time can also be tracked as well as stored in the computer memory as reference data for how long it has taken the excavator operator to remove this type of vegetation in the past or when it is time to bid on future jobs at this location. This may be accomplished by having the excavator operator input vegetation cleared areas on the map display in the excavator cab or this data may be input from sensor data. For example, when working in a lake or pond and the vegetation is underwater, side scan sonar sensors can provide real time scans indicating where the vegetation has been cleared and were the vegetation remains to the computer than can in turn provide feedback to the excavator operator via the display. In other working environments, such as when clearing an irrigation canal, the location where vegetation has been removed can be input via the input of sensor data or by manual input by the excavator operator.

Based on the amount of vegetation cleared, the productivity of the excavator can be calculated based on the vegetation removal plan. Also, based on input of the vegetation type (grass, weeds, lily pads, alder trees, etc.), the time it takes an excavator operator to remove the specific type of vegetation can be stored for future reference so that the estimated time for vegetation removal in particular areas based on particular vegetation conditions can be better estimated for the contractor.

If the excavator operator is working in an area where the slope of the vegetation removal is important such as when clearing irrigation canals, the computer can also track the desired gradient slope relative to the slope of the gradient during and after the vegetation is removed 1910. In an advanced application, the computer and excavator may be configured so that automated commands can be sent to the boom and vegetation removal rake without the excavator operator input regarding the removing vegetation outside the desired planned area of vegetation removal, when the gradient slope deviates from plan, or other deviations from the vegetation removal plan.

The computer and excavator may be configured such that the excavator operator merely monitors the vegetation removal process while the computer automatically directs the vegetation removal rake 2016. When such automation is employed, the automated control of the vegetation removal rake is performed by the computer 2018 and a display can output the automated operation of the rake in virtual form 2020. In another embodiment, the computer may provide guidance 2022 to the operator through the relay of visual and audio signals to the excavator operator 2022 and provide visual guidance of the actual rake orientation relative to any obstacles on the display 2024.

FIG. 20 is a block diagram of the process steps for receiving sensor data into a computer to assist an operator in the removal of vegetation when the vegetation removal rake is underwater. The vegetation removal area may be input as map coordinates or layout regarding the body of water that the excavator operator will clear and remove vegetation 2000. Along with the area where the vegetation will be removed, the location of any known obstacles 2002 may also be input into the computer's memory. The known water depth may also be input and/or compared with actual water depth data taken from a sensor 1812 located on the supporting platform such as a barge or boat 1804 that the excavator in positioned on so that the most accurate mapping of the water body bottom 1808 may be generated and provided to the excavator operator.

The dimensions of the vegetation removal rake may be input 2006 into the computer so that the precise location of the rake's edges is known by the computer. Sensors 1822 located on the excavator boom and the rake provide orientation information about the vegetation removal rake 1806 when it is located underwater and the excavator operator can no longer see its orientation or location relative to the bottom of the water body. The computer can calculate the correct rake orientation relative to the water depth and bottom slope orientation 2008. The computer calculations may be displayed 2010 to the excavator operator in visual or audio form so that the excavator operator may efficiently and safely remove the vegetation when they cannot see the vegetation removal rake under water.

For additional safety of the excavator operator and work crews as well as improved efficiency of the vegetation removal process, known obstacles such as rocks, pipelines, underwater power lines or low hanging overhead power lines may be input into the computer's memory and whose location is tracked during vegetation removal operations. Sensors located on the excavator barge or boat as well as alternatively located on the boom or rake may provide real time location of unknown obstacles that need to be avoided during vegetation removal operations 2012. If the computer detects an unknown obstacle 2014, the computer can provide guidance to the excavator operator 2016. If no unknown obstacles are detected, then the excavator operator can continue operations as usual 2010.

If an unknown obstacle is detected, the computer can signal the excavator operator by a visual or audio alarm or warning. If the excavator is rigged for automatic rake control 2016, the unknown obstacle can be displayed to the excavator operator and the computer will guide the vegetation removal rake so that the obstacle is avoided while the maximum amount of vegetation is removed from around the obstacle 2018. The rake and unknown obstacle may be displayed to the excavator operator tor manual intervention if so warranted 2020. If the excavator is not programmed for automated computer control of the vegetation removal rake, then the unknown obstacle is displayed to the excavator operator 2022 and appropriate warnings given to the excavator operator and the operator will manually position the vegetation removal rake as close to the obstacle without damaging the rake or potentially damaging the unknown obstacle 2024. Steps 2014 through 2024 can also be applied for dealing with obstacles that are known and input as part of the initial vegetation removal plan that is uploaded into the computer's memory.

Various embodiments of a process for guiding excavator operators in the removal of vegetation from irrigation canals or other areas where unwanted vegetation is growing as well as providing a guidance methodology for when the vegetation removal rake is not in view such as when it may be operating underwater may be executed by providing guidance to the excavator operator or may automate the process and provide automatic control of the rake system based on input data from at least one sensor to one or more computer systems. One such computer system is illustrated by FIG. 21.

The computer system 2100 may include one or more processors or processor cores 2102 that are connected to and interface with a system memory 2104 via an input/output (I/O) interface 2106. The computer system 2100 further includes a network interface 2108 coupled to I/O interface 2106 and connected to a wired or wireless network connection 2110. Also connected to the input/output device 2106 may be one or more input/output devices 2112, such as keyboard 2114, display(s) 2116, cursor control device 2118, a global positioning system ("GPS") 2120, audio device (not shown), analog and/or digital sensors 2122 and/or some other device. In some embodiments, it may be contemplated that may need to be implemented using a single instance of a computer system 2100, while in other embodiments multiple systems 2100 may be included, or multiple nodes making up the computer system 2100, may be configured to host different portions or instances of the embodiments. For example, in one embodiment some elements may be implemented via one or more nodes of computer system 2100 that are distinct from those nodes implementing other elements.

In various embodiments, the computer system 2100 may be a uniprocessor system including only one processor 2102 or processor core, or a multiprocessor system including a plurality of processors or processor cores 2102. Processors 2102 may be any suitable processor capable of executing instructions. For example, in various embodiments, processor(s) 2102 may be general-purpose or embedded processors implementing any of a variety of instruction set architectures (ISAs), such as the x86 (e.g. x86, x86-32, x86-64, and subsequent generations). PowerPC or Power ISA architectures. Reduced Instruction Set Computer ("RISC"). Complex Instruction Set Computer ("CISC"). Scalable Processor Architecture ("SPARC"), or Microprocessor without Interlocked Pipeline Stages ("MIPS") architecture, or any other suitable ISA, including derivative versions of this list or new architectures that may displace this list. In multiprocessor systems, each of the processors 2102 may commonly, but not necessarily, implement the same ISA.

System memory 2104 may be configured to store program instructions and/or data accessible by the processor(s) 2110. In various embodiments, the system memory 3104 may be implemented using any suitable memory technology, such as static random access memory (SRAM), synchronous dynamic RAM (SDRAM), nonvolatile/Flash-type memory, phase change, or any other type of memory. In the illustrated embodiment, program instructions and data implementing desired functions, such as those described for providing guidance to an excavator operator or providing automated control instructions to an excavator are shown stored within the system memory 2104 as program instructions 2124 and data storage 2126, respectively. In other embodiments, the program instructions and/or data may be received, sent or stored upon different types of computer-accessible media or on similar media separate from system memory 2104 or the computer system 2100. Generally speaking, a computer-accessible medium may include storage media or memory media such as magnetic or optical media, e.g., optical disks such as CDs, DVD-ROM or other variants coupled to the computer system 2100 via the I/O interface 2106. The program instructions and data stored via a computer-accessible medium may be transmitted by transmission media or signals such as electrical, electromagnetic, optical or digital signals, which may be conveyed via a communication medium such as a network and/or a wired or wireless link, such as may be implemented via network interface 2108.

In one embodiment, the I/O interface 2106 may be configured to coordinate I/O traffic between the processor(s) 2102, the system memory 2104, and any peripheral devices including network interface 2108 or other peripheral interfaces, such as the input/output devices 2112. In other embodiments, the I/O interface 2106 may perform any necessary protocol, timing or other data transformations to convert data signals from one component (e.g., system memory 2104) into a format suitable for use by another component (e.g. processor 2102). In still other embodiments, the I/O interface 2106 may include support for devices attached through various types of peripheral buses, such as a variant of the Peripheral Component Interconnect ("PCI") bus standard, the Universal Serial Bus ("USB") standard, or any other similar peripheral bus standard. In some embodiments, the function of the I/O interface 2106 may be split into two or more separate components, such as a north bridge and a south bridge. In addition, in some embodiments some or all of the functionality of the I/O interface 2106, such as an interface to system memory 2104, may be incorporated directly into the processor(s) 2102.

The Network interface 2108 may be configured to allow data to be exchanged between the computer system 2100 and other devices attached to a network, such as other computer systems, or between nodes of computer system 2100. In various embodiments, the network interlace 2108 may support communication via wired or wireless general data networks, such as any suitable type of Ethernet network, via telecommunications/telephony networks such as analog voice networks or digital fiber communications networks; via storage area networks such as Fibre Channel SANs, or via any other suitable type of network and/or protocol.

Input/output devices 2112 may, in some embodiments, include one or more display terminals, keyboards, keypads, touchpads, scanning devices, voice or optical recognition devices, analog or digital sensors 2122 or any other devices suitable for entering or retrieving data by one or more computer system 2100. Multiple input/output devices 2112 may be present in the computer system 2100 or may be distributed on various nodes of the computer system 2100. In some embodiments, similar input/output devices may be separate from the computer system 2100 and may interact with one or more nodes of the computer system 2100 through a wired or wireless connection, such as over a network interface 2108.

As shown in FIG. 21, the memory 2104 may include program instructions 2124, configured to implement embodiments providing guidance to an excavator operator or providing automated control instructions to an excavator and related data storage 2126, comprising various data accessible by the program instructions 2124. In one embodiment, the program instructions 2124 may include software elements for providing guidance to an excavator operator or providing automated control instructions to an excavator as illustrated in FIGS. 19 and 20. The data storage 2126 may include data that may be used in some of the embodiments while in other embodiments the different software elements and data may be included.

Those skilled in the an will appreciate that computer system 2100 is merely illustrative and is not intended to limit the scope of a software methodology for providing guidance to an excavator operator or providing automated control instructions to an excavator. In particular, the computer system 2100 and the Input/Output devices 2112 may include any combination of hardware or software that can perform the indicated functions, including computers, network devices, internet appliances, PDAs, wireless phones, pagers, etc. The computer system 2100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or in storage while being used, these items or portions of them may be transferred between memory and other storage devices for purposes of memory management and data integrity. Alternatively, in other embodiments some or all of the software components may execute in memory on another device and communicate with the illustrated computer system 2100 via inter-computer communication. Some or all of the system components or data structures may also be stored (e.g. as instructions or structured data) on a computer-accessible medium or a portable article to be read by an appropriate drive. In some embodiments, instructions stored on a computer-accessible medium separate from computer system 2100 may be transmitted to the computer system 2100 via transmission media or signals such as electrical, electromagnetic, or digital signals, conveyed via a communication medium such as a network wired and/or wireless link. Various embodiments may further include receiving, sending or storing instructions and/or data implemented in accordance with the foregoing description upon a computer-accessible medium. Accordingly, the invention may be practiced with other computer system configurations.

The various embodiments may further include receiving, sending or storing instructions and/or data implemented in accordance with the foregoing description of a computer-accessible medium. Generally speaking, a computer-accessible medium may include storage media or memory media such as magnetic or optical media. e.g. disk or CD-ROM, DVD-ROM, volatile or non-volatile media such as RAM (e.g. SDRAM, DDR. RDRAM, SRAM, etc.). ROM. etc. as well as transmission media or signals such as electrical, electromagnetic, or digital signals, conveyed via a communication medium such as network and/or a wireless link.

While various embodiments of the invention have been described, it will be apparent to those of ordinary skill in the art that many more embodiments and implementations are possible that are within the scope of this invention.

What is claimed is:

1. A non-transitory computer-readable medium storing instructions for operating an excavator having a vegetation removal rake for removing vegetation on the bottom of a body of water, the instructions, when executed performs the steps comprising:
    inputting a map plan representing an area of vegetation removal, where the map plan includes gradient information;
    receiving GPS coordinates representing location of the excavator;
    calculating the location of the excavator relative to the map plan representing the area of vegetation removal;
    sensing the position of the vegetation removal rake;
    determining where vegetation was removed; and
    providing guidance information via a display located in the excavator to an excavator operator about area where vegetation was removed on the map plan, and about the position of the vegetation removal rake relative to the location of the vegetation growing on the water bottom based on the gradient information, the area of vegetation removal, the location of the excavator relative to the map plan, and the position of the vegetation removal rake.

2. The non-transitory computer-readable medium of claim 1, where the map plan representing the area of vegetation removal includes map coordinates representing the area of the map plan where vegetation was removed.

3. The non-transitory computer-readable medium of claim 1, where the gradient information includes gradients of the map plan where the excavator will travel.

4. The non-transitory computer-readable medium of claim 1, where the gradient information includes gradients of an irrigation canal.

5. The non-transitory computer-readable medium of claim 1, where the gradient information includes gradients of the water body's bottom.

6. The non-transitory computer-readable medium of claim 1, further comprising the step of displaying information to the excavator operator about the gradient of the map plan.

7. The non-transitory computer-readable medium of claim 1, where the step of the guidance provided to the excavator operator includes productivity information regarding progress of the excavator in completing the map plan representing the area of vegetation removal.

8. The non-transitory computer-readable medium of claim 1, where the step of the guidance provided to the excavator operator includes obstacle location relative to the location of the excavator.

9. The non-transitory computer-readable medium of claim 1, where the step of the guidance provided to the excavator operator includes power line location relative to the location of the excavator.

10. The non-transitory computer-readable medium of claim 1, where the step of the guidance provided to the excavator operator includes pipeline location relative to the location of the excavator.

11. The non-transitory computer-readable medium of claim 1, where the step of the guidance provided to the excavator operator includes warning information about the location of pipelines, power lines or obstacles.

12. The non-transitory computer-readable medium of claim 1, where the step of the guidance information provided to the excavator includes automated commands instructing the excavator how to automatically manipulate attachments to an excavator boom.

13. The non-transitory computer-readable medium of claim 1, where the step of the guidance information includes displaying the map area where obstacles are located.

14. The non-transitory computer-readable medium of claim 1, where the step of the guidance information includes providing the excavator operator audio warnings.

15. The non-transitory computer-readable medium of claim 1, where the step of the guidance information includes providing the excavator operator visual warnings on a display.

16. A non-transitory computer-readable medium storing instructions for operating an excavator having a vegetation removal rake for removing vegetation on the bottom of a body of water, the instructions when executed, performs the steps comprising:
    inputting map information of a specific area of interest representing an area of vegetation removal, where the map information including gradient information;
    inputting GPS information representing location of the excavator received from GPS location data;
    inputting an excavator's vegetation removal rake size and orientation;
    calculating the excavator's location relative to the map information of the specific area of interest, and the excavator's vegetation removal rake location based on the location of the excavator and the vegetation removal rake's size and orientation;

determining where vegetation was removed; and displaying information to an excavator operator via a display located in the excavator regarding area where vegetation was removed on the specific area of interest, regarding the excavator's location, and the position of the vegetation removal rake relative to vegetation growing on the water bottom based on the gradient information, the area of vegetation removal, the location of the excavator relative to the specific area of interest, and the size and orientation of the vegetation removal rake.

17. The non-transitory computer-readable medium of claim 16, further comprising the step of inputting known obstacles in the map information of the specific area of interest.

18. The non-transitory computer-readable medium of claim 17, further comprising the step of calculating the location of the excavator's vegetation removal rake relative to the known obstacle.

19. The non-transitory computer-readable medium of claim 17, further comprising the step of displaying the excavator's vegetation removal rake position to the excavator operator relative to the known obstacle.

20. The non-transitory computer-readable medium of claim 17, further comprising the step of displaying the excavator's vegetation removal rake orientation to the excavator operator relative to the known obstacle.

21. The non-transitory computer-readable medium of claim 17, further comprising the step of transmitting commands to the excavator's vegetation removal rake so that the excavator's vegetation removal rake does not come into contact with the known obstacle.

22. The non-transitory computer-readable medium of claim 16, further comprising the step of inputting information regarding an unknown obstacle from data received by at least one sensor.

23. The non-transitory computer-readable medium of claim 22, further comprising the step of updating the map information of the specific area of interest based on the input information regarding the unknown obstacle.

24. The non-transitory computer-readable medium of claim 23, further comprising the step of calculating the location of the excavator's vegetation removal rake relative to the unknown obstacle.

25. The non-transitory computer-readable medium of claim 23, further comprising the step of displaying the excavator's vegetation removal rake position relative to the unknown obstacle to the excavator operator.

26. The non-transitory computer-readable medium of claim 23, further comprising the step of displaying the excavator's vegetation removal rake orientation relative to the unknown obstacle to the excavator operator.

27. The non-transitory computer-readable medium of claim 26, further comprising the step of transmitting automated commands to the excavator so that the excavator's vegetation removal rake does not come into contact with the unknown obstacle.

28. The non-transitory computer-readable medium of claim 16, further comprising the step of inputting sensor data regarding areas where vegetation was removed.

29. The non-transitory computer-readable medium of claim 28, further comprising the step of calculating the sensor data regarding the areas where the vegetation was removed relative to the map information of the specific area of interest.

30. The non-transitory computer-readable medium of claim 29, further comprising the step of calculating productivity time based on the vegetation removed relative to the map information of the specific area of interest.

31. The non-transitory computer-readable medium of claim 16, further comprising the step of overriding the excavator operator's manual commands regarding manipulation of the excavator's vegetation removal rake so that the excavator's vegetation removal rake does not come into contact with an obstacle.

* * * * *